United States Patent
Geddes et al.

(10) Patent No.: US 6,892,192 B1
(45) Date of Patent: May 10, 2005

(54) METHOD AND SYSTEM FOR DYNAMIC BUSINESS PROCESS MANAGEMENT USING A PARTIAL ORDER PLANNER

(75) Inventors: Norman D. Geddes, Cumming, GA (US); Douglas M. Hosmer, Marietta, GA (US)

(73) Assignee: Applied Systems Intelligence, Inc., Roswell, GA (US)

(*) Notice: Subject to any disclaimer, the term of this patent is extended or adjusted under 35 U.S.C. 154(b) by 521 days.

(21) Appl. No.: 09/598,750

(22) Filed: Jun. 22, 2000

(51) Int. Cl.[7] .............................................. G06F 15/18
(52) U.S. Cl. ........................... 706/14; 706/12; 706/61; 706/45
(58) Field of Search ............................ 706/14, 12, 61, 706/45

(56) References Cited

U.S. PATENT DOCUMENTS

| | | |
|---|---|---|
| 4,881,230 A | 11/1989 | Clark et al. ................. 371/20.1 |
| 5,167,010 A | 11/1992 | Elm et al. ...................... 395/50 |
| 5,299,287 A | 3/1994 | Tsuruta et al. ................. 395/51 |
| 5,359,649 A | 10/1994 | Rosu et al. .................. 379/220 |
| 5,406,477 A | 4/1995 | Harhen ........................ 364/401 |
| 5,428,619 A | 6/1995 | Schwartz et al. .......... 371/20.1 |
| 5,434,952 A | 7/1995 | Yen et al. ...................... 395/50 |
| 5,442,731 A | 8/1995 | Tanaka et al. |
| 5,550,746 A | 8/1996 | Jacobs ................... 364/479.01 |
| 5,583,763 A | 12/1996 | Atcheson et al. ...... 364/551.01 |
| 5,586,254 A | 12/1996 | Kondo et al. ............. 395/200.1 |
| 5,644,727 A | 7/1997 | Atkins ........................ 395/240 |
| 5,655,081 A | 8/1997 | Bonnell et al. ........ 395/200.32 |
| 5,701,400 A | * 12/1997 | Amado ........................ 706/45 |
| 5,706,406 A | 1/1998 | Pollock ....................... 395/55 |
| 5,712,960 A | 1/1998 | Chiopris et al. ............. 395/77 |
| 5,724,263 A | 3/1998 | Raguram et al. ........... 364/552 |
| 5,732,398 A | 3/1998 | Tagawa ......................... 705/5 |
| 5,754,850 A | 5/1998 | Janssen ....................... 395/615 |
| 5,809,212 A | 9/1998 | Shasha ......................... 706/46 |
| 5,835,922 A | 11/1998 | Shima et al. ................ 707/522 |
| 5,845,258 A | 12/1998 | Kennedy ........................ 705/8 |
| 5,893,083 A | 4/1999 | Eshghi et al. ................. 706/45 |
| 5,905,715 A | 5/1999 | Azarmi et al. ............... 370/244 |
| 5,918,207 A | 6/1999 | McGovern et al. ............ 705/1 |
| 5,953,707 A | 9/1999 | Huang et al. ................. 705/10 |
| 5,963,447 A | 10/1999 | Kohn et al. ............ 364/148.04 |
| 5,974,395 A | 10/1999 | Bellini et al. .................. 705/9 |
| 5,983,200 A | 11/1999 | Slotznick ..................... 705/26 |
| 5,995,959 A | 11/1999 | Friedman et al. .............. 707/3 |
| 6,006,192 A | 12/1999 | Cheng et al. ................... 705/7 |
| 6,012,044 A | 1/2000 | Maggioncalda et al. ...... 705/36 |
| 6,012,051 A | 1/2000 | Sammon, Jr. et al. ........ 706/52 |
| 6,012,152 A | 1/2000 | Douik et al. .................. 714/26 |
| 6,026,375 A | 2/2000 | Hall et al. .................... 705/26 |
| 6,049,742 A | 4/2000 | Milne et al. ................. 700/99 |
| 6,134,580 A | 10/2000 | Tahara et al. ............... 709/202 |
| 6,151,601 A | 11/2000 | Papierniak et al. .......... 707/10 |
| 6,272,482 B1 | 8/2001 | McKee et al. ................ 706/47 |

OTHER PUBLICATIONS

Anthony Barrett et al, Partial Order Planning: Evaluating Possible Efficiency Gains, Feb. 19, 1993, University of Washington 1–50.*

(Continued)

*Primary Examiner*—Anthony Knight
*Assistant Examiner*—Joseph P. Hirl
(74) *Attorney, Agent, or Firm*—Kilpatrick Stockton LLP

(57) ABSTRACT

A dynamic business process management system and method is disclosed for providing using a least commitment planner to better handle the changes and uncertainties that inevitably occur in the real-world. An embodiment of the invention provides a dynamic business process management system using partial-order planning. An additional embodiment of the present invention includes an intent interpreter module that supports the implementation of intelligent decision support functionality in a corporate information management interface.

10 Claims, 8 Drawing Sheets

OTHER PUBLICATIONS

Daniel S. Weld, An Introduction to Least Commitment Planning, 1994, University of Washington, 1–50.*
Marc Friedman et al, Least–Commitment Action Selection, University of Washington, 8 pages.*
Daniel S Weld, Recent Advances in AI Planning, Oct. 8, 1998, University of Washington, 1–49.*
Preliminary Examination Report for Application No. PCT/US01/19716, dated Jul. 22, 2002 (mailing date).
Preliminary Examination Report for Application No. PCT/US01/19652, dated Feb. 11, 2003.
International Search Report for Application No. PCT/US01/19652, dated Nov. 6, 2001 (mailing date).
International Search Report for Application No. PCT/US01/19714, dated Sep. 18, 2001 (mailing date).
International Search Report for Application No. PCT/US01/19713, dated Sep. 6, 2001 (mailing date).
Preliminary Examination Report for Application No. PCT/US01/19714, dated May 27, 2003.
McCarthy, John, "Nonmonotonic Reasoning," *Partial Formalizations and the Lemmings Game* [online], Mar. 2, 1998 [retrieved on Dec. 10, 2003], Retrieved from the Internet: <http://www–formal.Stanford.edu/jmc/lemmings/node22.html>.
Kappa–PC, "Object Browser" [online], [retrieved on Dec. 8, 2003], Retrieved from the Internet: <http://www.intellicorp.com/products/kappapc/download/kappa_pc_download.htm>.
Corkill, Daniel D., "Blackboard Systems," *AI Expert*, vol. 6, No. 9, pp. 40–47, Sep., 1991.
Rich, Elaine, "Artificial Intelligence," pp. 40–45, 72–75, 201, 204–207, 214–223, 247–277, and 284–285, New York: McGraw Hill (ISBN 0–07–052261–8), 1983.
"ERP Goes Mid–Market," *Modern Materials Handling*, v. 55, n. 1, p. 65, Jan., 2000.
Jedd, Marcia, "The Next Big Thing," *World Trade*, v. 12, n. 2, pp. 60–62, Feb., 1999.
Geddes, N. D., Smith, D. M., and Kizza, C. S., (1998) *Fostering Collaboration in Systems of Systems*, 1998 IEEE International Conference on Systems, Man and Cybernetics, Oct. 11–14, 1998, La Jolla, CA.
Geddes, N. D., and Lee, Robert J. (1998) *Intelligent Control for Automated Vehicles: A Decision Aiding Method for Coordination of Multiple Uninhabited Tactical Aircraft*, AUVSI '98 25th Annual Symposium and Exhibition, Jun. 8–12, 1998, Huntsville, AL.
Collis, J. C. and Lee, L. C., *Building Electronic Marketplaces with the ZEUS Agent Tool–Kit*, Agent Mediated Electronic Commerce, First International Workshop on Agent Mediated Electronic Trading, AMET–98, May 10, 1998, Minneapolis, MN.
Geddes, N. D., (1997) *A Portable Lightweight Associate For Urban Helicopter Pilotage*, 16th AIAA Digital Avionics Systems Conference, Oct., 1997, Irvine, CA.
Geddes, N. D., (1997) *Associate Systems: A Framework for Human–Machine Cooperation*, HCI Conference, Aug. 24–29, 1997, San Francisco, CA.
Geddes, N. D., (1997) *Human Centered Approaches to Mixed Initiative Planning*, May 6, 1997, DARPA P&DA Program.
Wegner, Peter, "Why Interaction is More Powerful Than Algorithms," *Communications of the ACM*, v. 40, n. 5, pp. 80–91, May, 1997.
Geddes, N. D., (1997) *Large Scale Models of Cooperative and Hostile Intentions*, IEEE Computer Society International Conference and Workshop on Engineering of Computer Based Systems (ECBS '97), Mar. 24–28, 1997, Monterey, CA.
Gilbert, D. and Janca, P., *Intelligent Agents: Internet Usability Enhancers*, 19th Annual Pacific Telecommunications Conference, PTC '97, pp. 677–682.
"Smart Move in a Networked World," *Computer Reseller News*, 1997, n. 731, p. 117.
Ross, Julie Ritzer, "Intelligent Agent" Test Probes Consumers' On–Line Shopping Needs, Stores, v. 78, n. 11, pp. 47–48, Nov., 1996.
Geddes, N. D., and Brown, J. L., (1996) *A Shared Model of Intentions for Free Flight*, AIAA/IEEE Digital Avionics Systems Conference, 179–184, Oct. 27–31, 1996, Atlanta, GA.
Houlder, Vanessa, *Technology: Fingers That Shop Around Retailing Faces on Upheaval Caused by "Intelligent Agents" on the Internet*, Financial Times London Edition, p. 14, Sep. 24, 1996.
"Andersen Project Examines How Electronic Merchants Can Better Target Customers," *Software Industry Report*, v. 28, n. 17, p. 1(2), Sep. 2, 1996.
"New Intelligent Agent Tackles Internet Privacy Issues: Andersen Consulting Experiment Examines How Electronic Merchants Can Better Target Customers in Cyberspace," *Business Wire*, p. 8271291, Aug. 27, 1996.
Renwei, Li and Pereira, L. M., *Knowledge–Based Situated Agents Among Us, Intelligent Agents III, Agent Theories, Architectures and Languages*, ECAI '96 Workshop Aug. 12–13, 1996, Budapest, Hungary.
Laborie, P. and Ghallab, M., *Planning With Sharable Resource Constraints*, IJCAI–95 Proceedings of the 14th International Joint Conference on Artificial Intelligence, vol. 2, pp. 1643–1649, Aug. 20–25, 1995, Montreal, Quebec, Canada.
Correll, James G., "Re–Engineering the MRP II Environment: The Key is Successfully Implementing Change," *IIE Solutions*, v. 27, n. 7, pp. 24–27, Jul., 1995.
Shalin, V. L. and Geddes, N. D., (1994) *Task Dependent Information Management in a Dynamic Environment: Concept and Measurement Issues*, IEEE 1994.
Geddes, N. D., (1994) *A Model for Intent Interpretation for Multiple Agents with Conflicts*, IEEE International Conference on Systems, Man and Cybernetics, Oct. 2–5, 1994, San Antonio, TX.
Soutchanski, M. and Ternovskaia, E., *Logical Formalization of Concurrent Actions for Multi–Agent Systems, Intelligent Agents*, ECAI–94 Workshop on Agent Theories, Architectures and Languages, Aug. 8–9, 1994, Amsterdam, Netherlands.
Etzioni, Oren and Weld, Daniel, "A Softbot–Based Interface to the Internet," *Communications of the ACM*, v. 37, n. 7, pp. 72–76, Jul., 1994.
Eklund, Peter W., "Research Developments in Multiple Inheritance with Exceptions," *The Knowledge Engineering Review*, v. 9, n. 1, pp. 21–55, Mar., 1994.
Shalin, V. L., Geddes, N. D., Mikesell, B., and Ramamurthy, M., (1993) *Evidence for Plan–Based Performance and Implications for Information Management on the Commercial Aviation Flight Deck*, 4th International Conference on Human–Machine Interaction and AI in Aerospace, Sep., 1993, Toulouse, France.

Shalin, V. L., Geddes, N. D., et al., (1993) *Expertise in Dynamic Physical Task Domains.* To appear in Feltovich, P., for, K. & Hoffman, R. (Eds.), *Expertise in Context: Human and Machine.*

Miller, C. A., Shalin, V. L., Geddes, N. D., and Hoshstrasser, B., (1992) *Plan–Based Information Requirements: Automated Knowledge Acquisition to Support Information Management in an Intelligent Pilot–Vehicle Interface,* Proceedings of the 11$^{th}$ Digital Avionics Systems Conference, Seattle, WA, 1992.

Geddes, N. D., Pullum, L., and Hoffman, M. A., (1992) *Intelligent Interfaces in Command and Control Systems,* Proceedings of IEEE Conference on C31 Technology and Applications, Jun. 1–4, 1992, Rome, NY.

Shalin, V. L., Miller, C. A., Geddes, N. D., Hoshstrasser, B. D., and Levi, K. R., (1992) AI Plan as Indicators of Human Information Requirements.

Geddes, N. D., and Hammer, J. M., (1991) "Automatic Display Management Using Dynamic Plans and Events," *Proceedings of the 6$^{th}$ Symposium on Aviation Psychology,* May 6–11, 1991, Columbus, OH.

Edwards, G. R., and Geddes, N. D., (1991) "Deriving a Domain–Independent Architecture for Associate Systems From Essential Elements of Associate Behavior," *Associate Technology: Opportunity and Challenges,* Lehner, P. E. (Editor), Fairfax, VA: George Mason University, Jun., 1991, pp. 17–29.

Lizza, C. S., Banks, S. B., (1991) *Pilot's Associate: A Cooperative, Knowledge–Based System Application,* DARPA Strategic Computing Initiative, IEEE Expert, Jun., 1991.

Chandrasekaran, B., Bhatnagar, R., and Sharma, D. D., "Real–Time Disturbance Control," *Communications of the ACM,* v. 34, n. 8, p. 32(16), Aug., 1991.

Shalin, V. L., Geddes, N. D., Hoshstrasser, B. D., Miller, C. A., Levi, K. R., and Persbacher, D. L., (1990) "Towards a Theory of Pilot Information Requirements During Plan Development and Execution," *Proceedings of CERT 90,* Toulouse, France.

Sewell, D. R., and Geddes, N. D., (1990) "A Plan and Goal Based Method for Computer–Human System Design," *Human Computer Interaction: INTERACT 90,* New York: North Holland, 283–288.

Rouse, W. B., Geddes, N. D., and Hammer, J. M., (1990) "Computer–Aided Fighter Pilots," *IEEE Spectrum,* Mar., 1990, 38–41.

Geddes, N. D. and Hoffman, M.A., (1990) "Supervising Unmanned Roving Vehicles Through an Intelligent Interface," *Proceedings of the 1990 Space Operations and Robotics Conference,* Albuquerque, NM.

Hoshstrasser, B. D. and Geddes, N. D., (1989) "OPAL: Operator Intent Inferencing for Intelligent Operator Support Systems," *Proceedings of the IJCAI–89 Workshop on Integrated Human–Machine Intelligence in Aerospace Systems,* Shalin, V. L. and Boy, G. A. (Editors), Aug., 1989, Detroit, MI.

Webb, B. W., Geddes, N. D., and Neste, L. O., (1989) "Information Management with a Hierarchical Display Generator," *Proceedings of the National Computer Graphics Association,* Washington, DC.

Howard, C. W., Hammer, J. M., and Geddes, N. D., (1988) "Information Display Management in a Pilot's Associate," *Proceedings of the 1988 Aerospace Applications of Artificial Intelligence Conference,* 1, 339–349.

Sewell, D. R., Geddes, N. D., and Rouse, E. B., (1987) "Initial Evaluation of an Intelligent Interface for Operators of Complex Systems." In G. Salvendy (Eds), *Cognitive Engineering in the Design of Human–Computer Interaction and Expert Systems* (551–558), New York: Elsevier.

Rouse, W. B., Geddes, N. D., and Curry, R. E., (1987) "An Architecture for Intelligent Interfaces: Outline of an Approach to Supporting Operators of Complex Systems," *Human–Computer Interaction,* 3, 87–122.

Hammer, J. M. and Geddes, N. D., (1987) *Design of an Intelligent Monitor for Human Error in a Complex System,* Paper presented at AIAA Computers in Aerospace VI Conference, Wakefield, MA.

Geddes, N. D., (1986) "The Use of Individual Differences in Inferring Human Operator Intentions," *Proceedings of the Second Annual Aerospace Applications of Artificial Intelligence Conference,* 30–41.

Geddes, N. D., (1985) "Intent Inferencing Using Scripts and Plans," *Proceedings of the First Annual Aerospace Applications of Artificial Intelligence Conference,* 160–172.

Naoki Kanai, Shinji Yokoi, Koichi Fukunaga, and Yoshio Tozawa, "An Expert System To Assist Production Planning", International Workshop on Artificial Intelligence for Industrial Applications 1998, IBM Research, Tokyo Research Laboratory, pp. 219–224.

* cited by examiner

METHOD AND SYSTEM FOR DYNAMIC BUSINESS PROCESS MANAGEMENT USING A PARTIAL ORDER PLANNER

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to the field of business process management, and more particularly to an extended enterprise operations system using a least commitment planner to more effectively handle ever changing real-world business situations by providing a dynamic business process management system.

BACKGROUND INFORMATION

Enterprise resource planning (ERP) systems are often touted as attempts to provide a single solution for integrating business processes across an organization, or even across an entire supply chain, tying inventory control systems, manufacturing resource planning, sales and order management, marketing, purchasing, warehouse management, financial and managerial account, and human resource management so that all business processes are at the fingertips of corporate executives. In effect, ERP is an attempt to reduce all aspects of a business to a model that can then be tested, simulated, modified, refined, and examined so that a corporate manager can increase the efficiency of the entire business.

The use of ERP systems has increased business efficiency, especially for large, complex manufacturing operations. By providing the ability to simulate various scenarios, ERP systems assist managers to more effectively handle business process problems such as shortages, labor problems, quality control problems, etc. In short, by reducing business processes to a model of resources and constraints, ERP systems provide a tool for viewing the current state of an operation and a test bed for considering modifications to business processes.

Conventional ERP systems operate by treating business process modeling and simulation as a scheduling problem. A business is modeled as a set of processes, a collection of resources and a set of constraints whereby a company must determine how best to use its limited resources to achieve the largest benefit attainable. By solving the scheduling problem, conventional ERP systems attempt to provide a filly-ordered plan that optimally solves the problem presented to it.

Scheduling is a subproblem of the more general problem of planning. To characterize this, the following definitions are broadly accepted:

Scheduling subproblem: given a set of activities $a_1 \ldots a_n$, with precedent relationships $a_j > a_k$, and a set of resources $r_1 \ldots r_m$ needed to perform the activities, what is the best allocation and ordering of the activities and resources. Best is normally expressed as the optimal value of some expression $J(r_i)$ that is related to the cost of the resources used and the benefits obtained.

Planning subproblem: given one or more objectives, what is the best set of activities $a_1 \ldots a_n$ and what are the precedence relationships $a_j > a_k$ that exist between them to accomplish the desired objectives.

Clearly, these definitions imply that the scheduling subproblem cannot be approached until after the planning subproblem has been solved. In addition, each of these subproblems, when formulated for real-world cases other than relatively trivial textbook examples, are easily within the class of problems known in computing theory as NP-Complete.

Current approaches to ERP and SCM typically assume a static set of activities as the business model. In pursuing a resource allocation, these ERP and SCM optimization processes can change attributes of activities, such as start and end times and allocation of resources to activities, but conventional ERP and SCM systems do not seek to change the set of activities themselves. This static set of activities defines a static business model.

Unfortunately, a static ERP business model cannot be completely accurate and cannot account for all contingencies. In actuality, there are many potential variations in the business models of companies. As goals change, the business processes themselves may need to be fundamentally changed. Often, the optimal schedule is not the best plan to handle the uncertainties of the real world because it is not the most robust. In the real world, requirements and resources are not static. The operation of a business is a dynamic process and it is desirable to provide a system for dynamic business process management that can better handle the inevitable changes that confront a corporate manager every day. It is desirable to provide a system for dynamic modification of business process models that permits dynamic changes in the planned set of activities as well as the schedule and resource allocations.

The value of planning is solely in its ability to improve the execution of a complex undertaking. The improvements may take the form of more effective resource allocation or more effective coordination between parties or more certain outcomes. The creation of plans that do not improve execution is itself a poor use of resources.

Determining an optimal plan in the face of uncertainty is often a waste of resources because the available resources and constraints in real-world problems change over time, sometimes faster than a new optimal plan can be recalculated. Before an optimal plan is completely carried out, a change will often force reconsideration and recalculation. Because solving the optimal scheduling subproblem is typically very computationally expensive, changes may occur in the pre-conditions before the result can even be calculated. Optimal schedulers do not have a mechanism for graded levels of commitment to activities and their parameters. When a change occurs, the entire schedule must be re-computed. As a result, a small change in input values to the optimal scheduler can produce a large change in the resulting schedule. Activities that were once possible to schedule may now become unscheduled. Conventional ERP systems attempt to create so-called "optimal" or fully ordered plans often requiring repeated reconsideration and recalculation.

An alternative view to optimal planning emphasizes adaptation. Modern control theory is based on adaptation. For example, the driver of a car does not plan about steering the car to stay on the roadway. Instead, steering behavior is continuously adapted to meet the needs of the situation. However, pure adaptation is not fully effective either—unless the driver has a plan in the form of an intended route to his destination, he may well become lost.

Partial order, least commitment planning is a method that blends planning and adaptation to produce robust behaviors. Activities are only partially planned, leaving many details to be determined by adaptation during the actual execution. However, the extent of planning is sufficient to ensure that the resulting behavior is feasible and can nominally be performed. Partial-order, least commitment planning allows an extended business enterprise to adapt flexibly to the changes in day to day operations while still achieving coordination and feasibility. It is desirable to provide a dynamic business process management system that calculates partial-order, least commitment plans for operating a business enterprise.

Partial order, least commitment planners also provide for graded levels of commitment to a set of activities. This allows the planner to maintain multiple alternative means to achieve multiple simultaneous goals, and increase or decrease its level of commitment to each of the alternatives as the situation unfolds. In this way, the choice of alternative to execute can be deferred until it is clear which alternative is superior. A partial order least commitment planner is also able to select multiple alternatives for execution as a means for hedging against uncertainty in outcomes.

Additionally, as business processes become more complex and as models become more detailed, the optimal planning mechanisms of conventional ERP systems takes longer and longer to complete. Many algorithms for schedule optimization have execution times of Order (n-cubed) or greater. Some optimal scheduling problems are known to be members of the very difficult and expensive class of problems known as NP-complete. It is therefore desirable to provide a planning mechanism that is faster than conventional optimal, fully-ordered planners Corporate managers desire fast, perhaps even real-time feedback and adaptation to cope with dynamic business situations.

Several related patents have been issued by the United States Patent and Trademark Office. For example, U.S. Pat. No. 5,299,287 issued to Tsuruta et al. (the '287 patent) discloses a method of knowledge management for dividing a goal into lower level subgoals. Additionally, the '287 patent discloses a system for cooperative goal and plan sharing between actors in the system. There is a need for a system that incorporates goal decomposition and cooperative planning in a business process management system. There is also a need for a system that performs partial order planning to better handle real-time, dynamic business process systems.

SUMMARY OF THE INVENTION

In accordance with the present invention, a system for conducting dynamic business process management for extended enterprise operations using partial order, least commitment planning is provided. The system includes a knowledge base for storing expert knowledge about one or more business process domains, an inference engine coupled to the knowledge base that includes a least commitment planner, a management system that collects data regarding one or more business processes and determines one or more goals, and a graphical user interface system that displays information regarding business processes. The inference engine uses the partial order, least commitment planner to determine one or more plans for achieving one or more determined goals.

BRIEF DESCRIPTION OF THE DRAWINGS

The present invention is further described in the detailed description which follows, by reference to a plurality of drawings by way of non-limiting examples of illustrated embodiments of the present invention, in which like reference numerals represent similar parts throughout the several drawings, and wherein.

GLOSSARY

Figure 1:
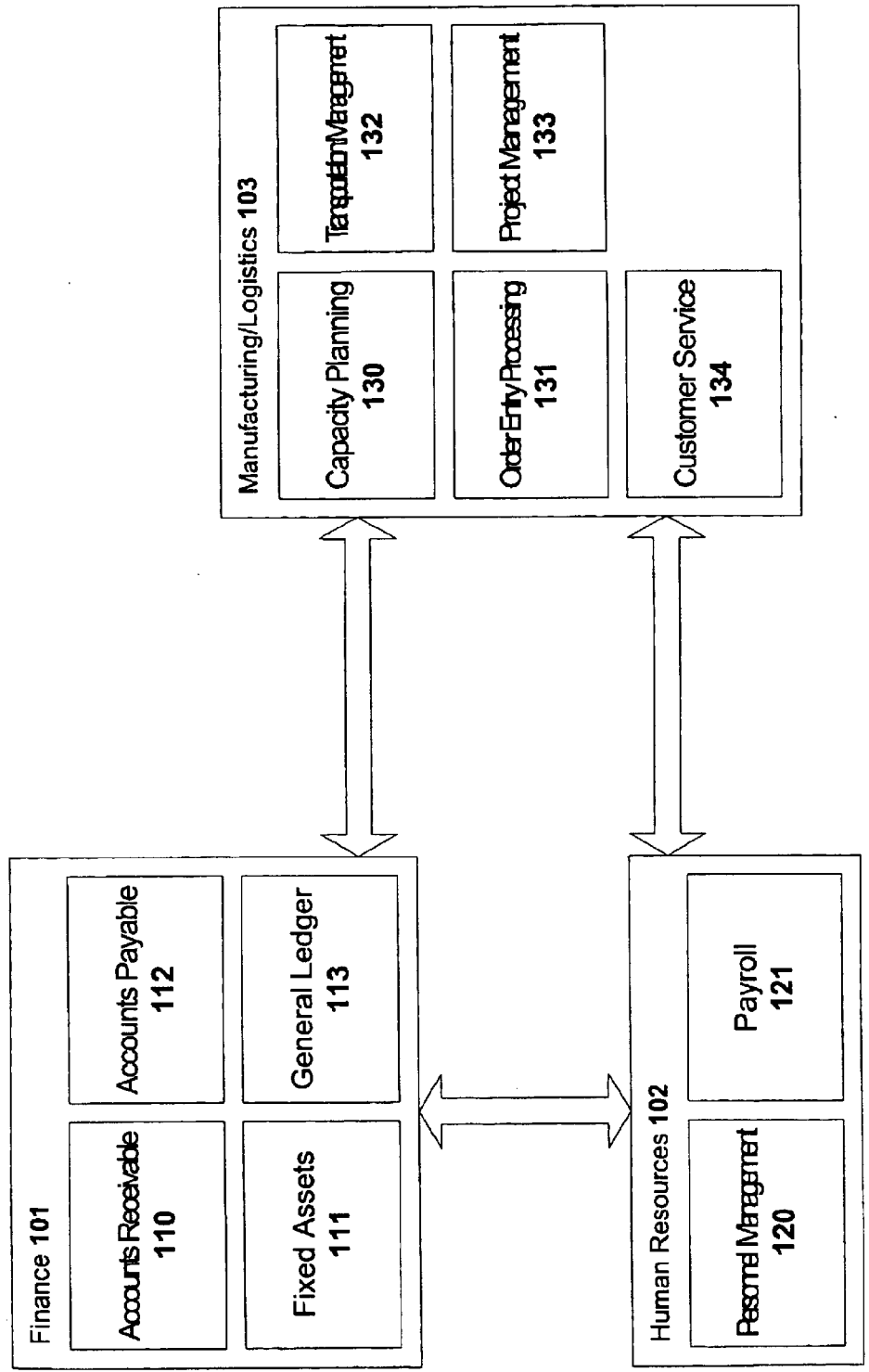
FIG. 1 is a block diagram illustrating a typical business process management system according to an embodiment of the present invention.

Concept Graph: a knowledge representation of the dependencies between observable data values and higher-level computations and assertions made about the data. A concept graph can be implemented as a directed acyclic graph of concept nodes that is a particular type of augmented transition network (ATN).

Expert System: a computer program that uses a knowledge base to assist in solving problems. Most expert systems use an inference engine to derive new facts and beliefs using a knowledge base.

Full-Order Planner: (also called a total-order planner) a process that computes a fully-ordered list of primitive steps or actions to reach a goal, in which each step or action is fully definitized at the completion of the planning process.

Inference Engine: a computer program that infers new facts or beliefs from known facts or beliefs using a knowledge base and a set of logical operations.

Intent Interpreter: an expert system that uses a knowledge base to determine the present intention of a user or a system.

Knowledge Base: a collection of knowledge (e.g., objects, concepts, relationships, facts, rules, etc.) expressed in a manner such that it can be used by an inference engine. For example, a knowledge base may include rules and facts or assertions as in traditional expert systems.

Least Commitment Planner: a process that generates a plan that avoids making a choice between two or more alternative courses of action unless it is necessary to do so. A least commitment planner avoids definitizing any particular sub-element of a plan beyond the minimum necessary to determine likely success. Final definitization of the primitive steps is deferred until just prior to the execution of each plan sub-element by a plan execution agent.

Primitive step. a representation of an activity that is not further decomposed by a planner. Also called a primitive action.

Partial-Order Planner: a process that generates a partially ordered set of activities at the completion of the planning process.

Plan. a abstract representation of a set of activities to be performed from the present into the future. A plan may be decomposable into plan sub-elements that define more detailed activities. The lowest level of decomposition of a plan is a primitive step or action.

Plan Execution Agent. a process that directly operates on the environment by performing activities represented by a plan.

Plan-Goal Graph (PGG): a knowledge representation for expressing causal relationships in an operational domain as well as the intentions of a user. A PGG can be expressed as an acyclic, directed graph where plans are decomposed into subgoals or primitive actions.

Planner: a computer program that determines a sequence of operations or actions to be taken to reach one or more goals.

Non-Monotonic Truth Maintenance: a system for maintaining the consistency of beliefs, assumptions, justifications and/or assertions in a knowledge base wherein knowledge can be retracted when an inconsistency is detected.

DETAILED DESCRIPTION OF THE ILLUSTRATED EMBODIMENTS

The present invention includes methods and systems for providing dynamic business process management services with partial order, least commitment planning. Conventional enterprise resource planning (ERP) systems are known in the art such as those marketed by SAP™, JD Edwards™, Oracle™, and Peoplesoft™. The embodiment described below is a software implementation of the present invention that improves upon conventional ERP systems. Using the following description, one of ordinary skill in the art will be able to practice the present invention using conventional software development tools and techniques. The preferred embodiment of the present invention is developed in C++ on a Sun Microsystems™ server running the Solaris™ operating system.

The various embodiments of the present invention improve on traditional artificial techniques. One of ordinary skill in the art may find the following references helpful in providing appropriate background understanding in the design and construction of inference engines, knowledge bases, and various knowledge representations used by the present invention: (1) Schank, R. C. and Abelson, R., Scripts, Plans Goals and Understanding, Hillsdale, N.J.: Lawrence Erlbaum Associates (1977); (2) Schank, R. C. and Riesbeck, C. K., Inside Computer Understanding. Hillsdale, N.J.: Lawrence Erlbaum Associates (1981); (3) Sacerdoti, E. D., A Structure for Plans and Behaviors, New York: Elsevier (1978); (4) Rinnooy Kan, A. H. G., Machine Scheduling Problems. The Hague: Martinus Nijhoff (1976); and (5) Charniak, E, Riesbeck, C. K. and McDermott, D., Artificial Intelligence Programming. Hillsdale, N.J.: Lawrence Erlbaum Associates (1980).

FIG. 1 is a block diagram illustrating a dynamic business process management system. In this implementation, there are three basic groups of functionality implemented as an integrated toolset for business information management. The functional groups include the following: (1) Finance 101; (2) Human Resources 102; and (3) Manufacturing/Logistics 103.

Finance 101 provides various components to assist corporate managers in bookkeeping. For example, the dynamic business process management system includes a general ledger 113 for maintaining a list of all accounts, both internal and external to the corporation. The general ledger 113 provides an information store that includes all accounting details of the corporation as well as analysis tools.

In addition to the general ledger 113, the Finance 101 component of the dynamic business process management system includes both an accounts receivable 110 component and an accounts payable 112 component. Accounts payable 112 tracks all bills that must be paid by the company and provides tools for scheduling payments and analyzing the outflow of corporate resources. On the other hand, accounts receivable 110 maintains customer accounts and other moneys owed to the corporation. Together, accounts receivable 110 and accounts payable 112 provide accounting tools that assist corporate managers analyze and track the flow of cash through the corporation.

Next, the fixed assets 111 component of the Finance 101 resources is information store and toolset for managing and tracking tangible, depreciable assets such as buildings, equipment, and property. This component allows a corporation to track depreciation and expenses associated with these assets.

Human Resources 102 provides various components to administer and maintain human resource information and processes. For example, a corporation must maintain information regarding their employees such as home addresses, Social Security Numbers, dates of employment, salary information, etc. The present implementation of a dynamic business process management system includes a personnel management 120 component that maintains all necessary information about each employee including the employee's name, home address, supervisor, Social Security Number, tax withholding information, date of employment, etc. Closely tied to the personnel management 120 system is a payroll 121 system. Payroll 121 provides an information management solution that assists the corporation in paying its employees.

Finally, Manufacturing/Logistics 103 provides components for managing business processes associated with the actual manufacturing operations of a company including: (1) capacity planning 130; (2) order entry processing 131; (3) transportation management 132; (4) project management 133; and (5) customer service 134.

The capacity planning 130 module of the present dynamic business process management system implementation assists companies in planning the daily production schedule for a corporation's manufacturing facilities. For example, capacity planning 130 may help an automobile manufacturer determine the efficient use of an assembly line. If there is a predicted surplus of parts, capacity planning 130 may help adjust production to meet the demands of the market.

The order entry processing 131 system helps a corporation monitor and process orders placed by customers. When an order for a customer is received, it is entered into the order entry processing 131 system. By having this data integrated with manufacturing data, corporations are better able to adjust production to meet the demands of customers. Closely tied to order entry processing 131 is transportation management 132. Once a customer's order is ready to be delivered, transportation management helps plan, schedule, and track the delivery.

In any corporation, there are numerous projects that are ongoing at any point in time. The Project management 133 system helps corporate managers track the progress of each project, quickly detecting slippages and analyzing how a slippage will affect other projects and other operations of the organization.

Finally, the customer service 134 component assists the corporation in tracking and responding to customer inquiries and suggestions. For example, customer service 134 may assist a company in managing a help desk where customers can call in to ask questions, report problems, and obtain additional information about the corporation and its various products and services.

Each of the components of a dynamic business process management system described above including Finance 101, Human Resources 102, and Manufacturing/Logistics 103 information systems are integrated to provide a platform for corporate managers to plan, simulate, test, and observe the day-to-day operations of a company.

Figure 2:
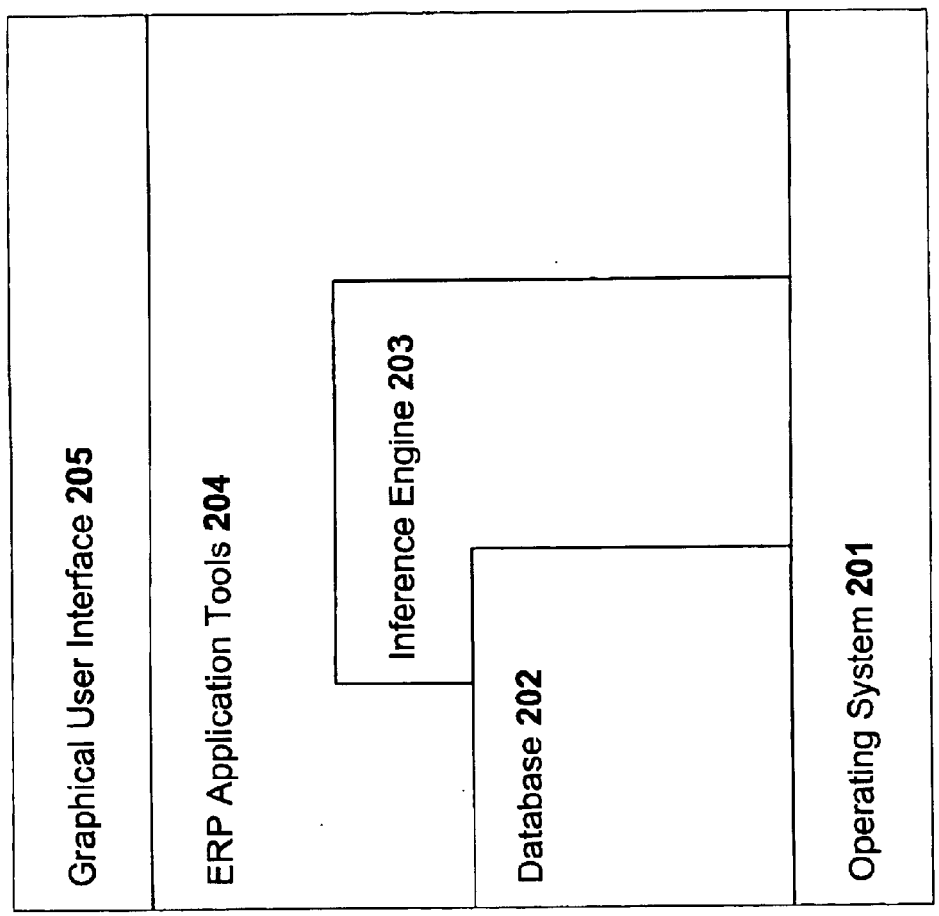
FIG. 2 is a block diagram describing a software implementation of an business process management system according to an embodiment of the present invention.

FIG. 2 shows a schematic diagram describing an implementation of a dynamic business process management system. Each software component depends on operating system 201. In the preferred embodiment of the present invention, operating system 201 is the Solaris operating system that runs on Sun Microsystems™ and Intel™-based computers.

The operating system 201 provides a platform for executing software applications and provides a standardized interface that abstracts from the details of the underlying computer's hardware. A database 202 is run on top of operating system 201 providing a mechanism for storing, search, and retrieving large amounts of data. In the preferred embodiment of the present invention, database 202 is an Oracle™ database.

Using database 202 and operating system 201, inference engine 203 provides the tools and framework for performing least commitment planning. In conventional ERP systems, inference engine 203 is an optimal scheduler. The present invention improves on the prior art by providing a partial-order, least commitment planner to increase the performance and to better handle the uncertainties and challenges encountered in the real-world.

Finally, the graphical user interface 205 provides a mechanism for interacting with users by displaying data on a computer screen and by receiving user input from a device such as a mouse, keyboard, or touch screen.

Figure 3:
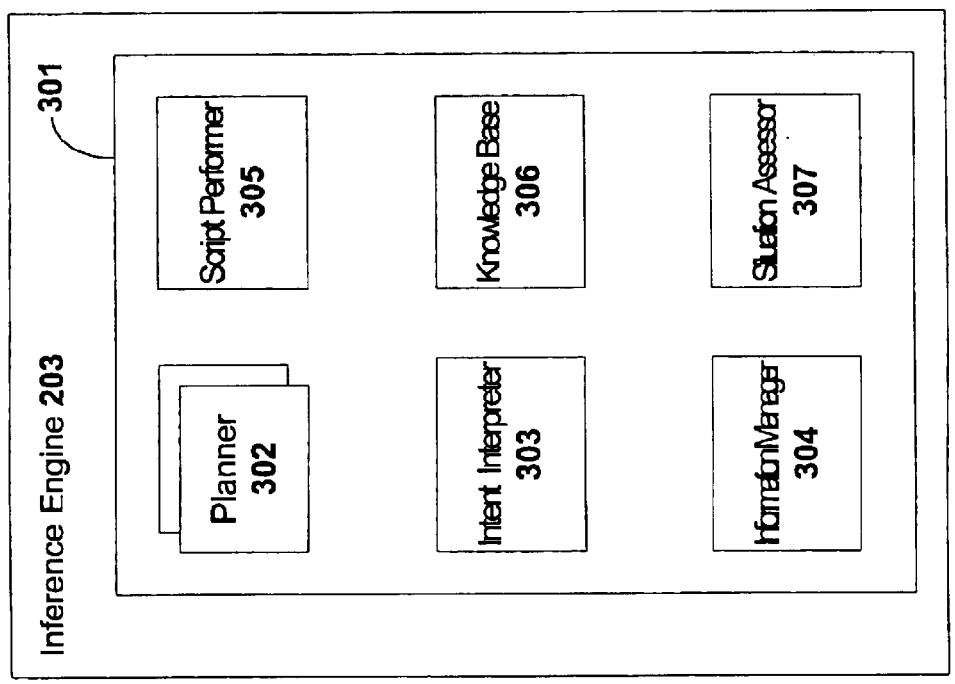
FIG. 3 illustrates an inference engine for performing least commitment planning according to one embodiment of the present invention.

FIG. 3 is a schematic diagram illustrating inference engine 203 according to one embodiment of the present invention. Inference engine 203 includes one or more planners 302, an intent interpreter 303, an information manager 304, a script performer 305, a knowledge base 306, and a situation assessor 307. Each of these components is described in more detail below. In addition, the following publications describing various exemplary implementations of the constituent components of an inference engine are hereby incorporated by reference: (1) Hoshstrasser, Belinda Hardman and Norman D. Geddes. Proceedings of the International Joint Conferences on Artificial Intelligence 1989 Workshop on Integrated Human-Machine Intelligence in Aerospace Systems. *OPAL: Operator Intent Inferencing for Intelligent Operator Support Systems*. (Aug. 21, 1989); (2) Geddes, Norman D., et al. *Fostering Collaboration in System of Systems*; (3) Rouse, William B., et al. *An Architecture for Intelligent Interfaces: Outline of an Approach to Supporting Operators of Complex Systems. Human-Computer Interaction*, vol. 3, pp. 87–122 (1987); (4) Geddes, Norman D. and Mark A. Hoffman. *Supervising Unmanned Roving Vehicles Through an Intelligent Interface*; (5) Geddes, Norman D., et al. *Automated Acquisition of Information Requirements for an Intelligent Display*; (6) Miller, Christopher A., et al. *Plan-Based Information Requirements: Automated Knowledge Acquisition to Support Information Management in an Intelligent Pilot-Vehicle Interface*. Digital Avionics Systems Conference (Seattle, Wash., Oct. 5–9, 1992); (7) Geddes, Norman D., *Large Scale Models of Cooperative and Hostile Intentions. IEEE Computer Society, International Conference and Workshop on Engineering of Computer Based Systems (ECBS'97)* (Monterey, Calif., Mar. 27–28, 1997); (8) Webb, Barry W., Norman D. Geddes, and Leslie O. Neste. *Information Management with a Hierarchical Display Generator*; (9) Rouse, W. B., N. D. Geddes, and J. M. Hammer. Computer-aided fighter pilots. *IEEE Spectrum*. pp.38–41 (March 1990); (10) Geddes, N. D. and R. J. Lee. Intelligent Control for Automated Vehicles: A Decision Aiding Method for Coordination of Multiple Uninhabited Tactical Aircraft. *Association for Unmanned Vehicle Systems International AUVSI'98 25th Annual Symposium and Exhibition*. (Huntsville, Ala., Jun. 8–12, 1998); (11) Geddes, N. D., R. J. Lee, and J. L. Brown. A Portable Lightweight Associate for Urban Helicopter Pilotage. *Submitted to IEEE* (Sep. 25, 1997); and (13) Geddes, N. D. "Associate Systems: A framework for human-computer cooperation" *7th International Conference of Human-Computer Interaction*. (San Francisco, Calif., Aug. 24–29, 1997).

First, we discuss the one or more planners 302. Any conventional planner can be used with the present invention; however, the preferred embodiment uses a real-time, partial-order, least-commitment planner. Such a planner is able to effectively manage real-time operation in a changing world. In a business system, the current state of the system is constantly changing. For example, new orders are being placed, efficiencies change, consumer supply fluctuates, and the availability of labor and parts changes. A dynamic business process management system that only plans to the level of detail necessary to ensure feasibility for given constraints conserves resources by preventing excessive planning in a dynamic environment where preferences, goals, and intentions are always changing. Additionally, by only planning as far in advance as is necessary, a system can preserve options so assets are not committed until they are needed. In one embodiment of the present invention, the partial order, least commitment planner uses an abstract decomposition of the business objectives. This decomposition is represented as a plan and goal graph (PGG), an acyclic, directed graph that represents the hierarchy of possible goals that may be pursued to achieve an intention and the methods (or plans) that can be used to satisfy each goal Broad, general plans are represented by plan nodes of the PGG that are higher in the directed acyclic graph structure, while lower-level plan sub-elements provide increasing levels of detail in the lower levels of the PGG. A partial order planning system using a plan and goal graph (PGG) is described by N. D. Geddes and R. J. Lee in a paper entitled "Intelligent Control for Automated Vehicles: A Decision Aiding Method for Coordination of Multiple Uninhabited Tactical Aircraft" published June 1998.

Traditional ERP systems use a full-order planner. A planner determines a sequence of activities that can be taken to achieve as many desired states or goals as possible given available resources and domain constraints. A full order planner determines the "optimal" sequence of activities to be taken. Because this process requires searching all combinations of activities to determine the best combination, it is order n-cubed or worse in the number of activities. Partial order planners compute less than the "optimal" sequence of activities to be taken. For example, one type of partial order planner is a least commitment planner that operates by committing to as little as possible, thus reducing exponential growth of the search space resulting in increased planning speed. Since all plans are not necessarily considered, a partial order planner may not find the optimal sequence of activities for reaching one or more goals; however, a plan that satisfies domain and resource constraints will be quickly provided and the resulting plan can be recalculated as changes occur.

Figure 6:
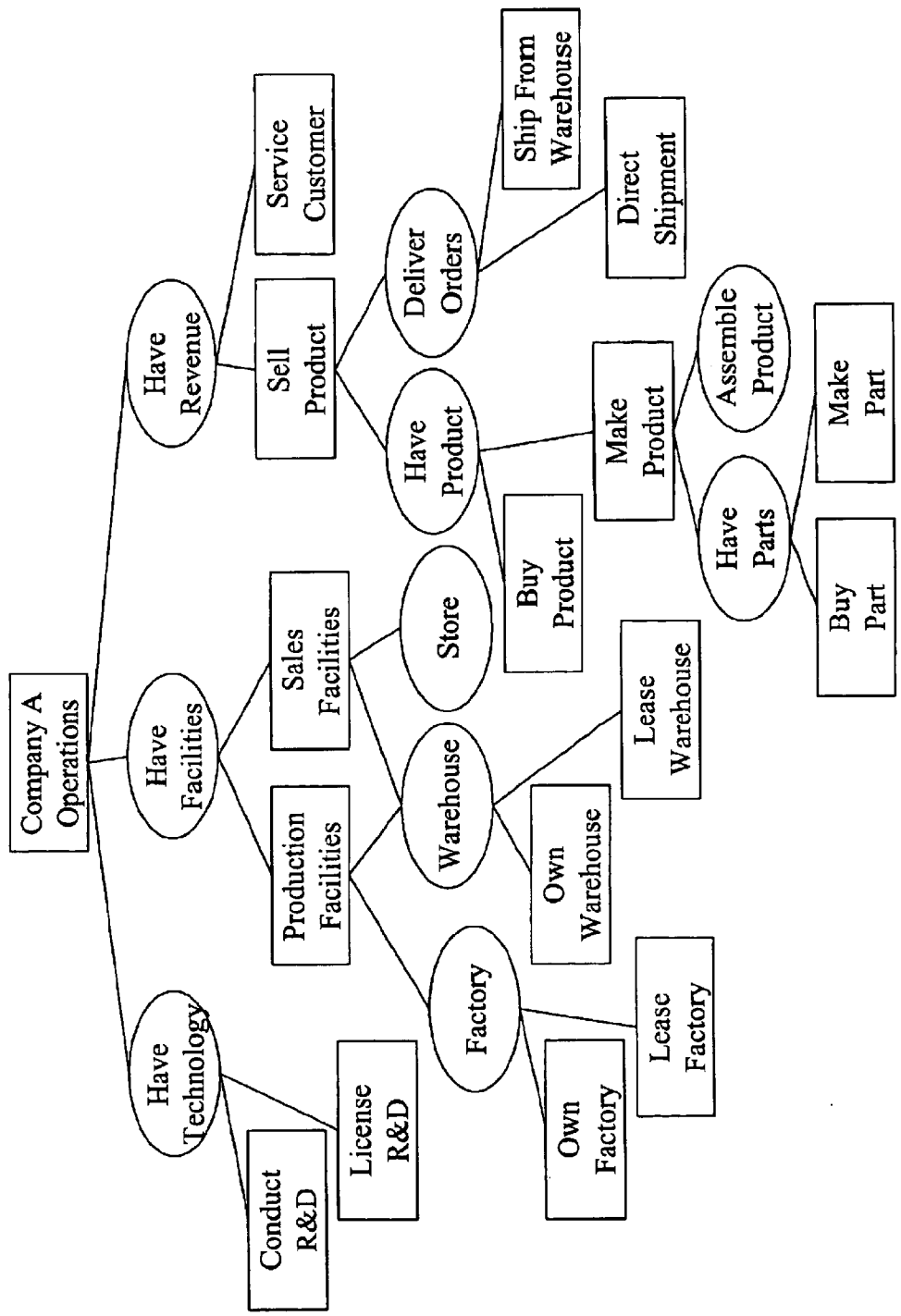
FIG. 6 illustrates a portion of a plan-goal graph (PGG) according to one embodiment of the present invention.

In one embodiment of the present invention, the planner 302 is a partial order planner and manages its level of commitment to the activities in the plan by using a state transition method to set the life cycle states of plan sub-elements. One embodiment of the plan life cycle state transitions is shown in FIG. 6. As a plan sub-element moves through its life cycle states from candidate towards the active state, the partial order planner is increasing its commitment to that plan sub-element. The partial order planner may also reduce its commitment by changing the plan sub-element state to rejected state or revoked state and ultimately to a terminated state. This mechanism provides a non-monotonic, graded level of commitment for each plan sub-element.

In one embodiment of the present invention, state transitions of the plan sub-elements are performed by the planner 302 in response to event signals received from the situation assessor 307. When the planner 302 moves a plan sub-element to a new life cycle state, the planner 302 requests the activation of specific monitors within situation assessor 307. In one embodiment of the present invention, the monitors represent the conditions under which a plan sub-element should be transitioned to a different one of its plurality of life cycle states. The situation assessor 307 periodically evaluates the specific monitors that have been activated, and provides an event signal to the planner 302 for each specific monitor whose conditions are satisfied.

In another embodiment of the present invention, a plurality of dynamic business process management systems after the present invention, and each containing an inference engine with a planner 302, can send and receive plan instances and life cycle changes for plan instances to each other. In this manner, sharing of planning and graded commitment between the separate dynamic business process management systems is performed, allowing all participating systems to take advantage of information about the plans made by another such system. The communications may take place over a plurality of communications means, including direct connection, telephony, wireless medium, or network, such as Internet or local area networks.

One embodiment of the present invention includes intent interpreter 303. In this embodiment, the dynamic business process management system monitors a user's actions to determine what the user is trying to accomplish. The intent interpreter does this using a task-analytic decomposition of the purposes of operators within the business process domain. In the preferred embodiment, this decomposition is represented as a plan and goal graph (PGG). Additionally, intent interpreter 303 uses knowledge represented as scripts. These scripts are sequences of partially specified primitive actions whose execution may be dependent on the state of the execution context. Other embodiments may use scripts that may include non-primitive actions (e.g., recursive script calls or additional script calls). Scripts represent standard procedures or business processes that are routinely used to perform specific business processes described by plan sub-elements. Such standard business procedures may include standard responses to both normal and abnormal events and operating conditions within an enterprise. The intent interpreter 303 uses reasoning on the PGG to represent problem solving behaviors that are necessary when existing business processes defined by scripts are not appropriate for the situation. Using assertions made by the other components of the system together with domain knowledge stored in knowledge base 306, the intent interpreter determines the most likely intent of a user. This determined intent is then used to update the information being displayed to the user and to generate one or more plans to satisfy the interpreted goals of the operator.

One embodiment of the present invention uses an intent interpreter similar to that described by B. H. Hoshstrasser and N. D. Geddes in a paper entitled "OPAL: Operater Intent Inferencing for Intelligent Operator Support Systems" published July 1989. The intent interpreter includes a model of user intent expressed as both scripts and plan-goal graphs. The system tries to understand operator actions in terms of its current model of user intent. An action is said to be "explained" if it is consistent with what was expected by the intent model.

The intent interpreter first tries to interpret the intent of a user action using script-based reasoning. This is equivalent to evaluating the user's behavior in the context of existing active standard business procedures of the organization. Each active script in the current intent model is examined to determine if the action is an expected step in the execution of the script. If the action matches an event in an open segment of a script, the event is marked as completed and the user action is explained. All active scripts are searched, even if a match is found early on, since a particular action may occur in more than one active script. When the script-based reasoner runs, it evaluates the termination conditions of each script to determine if any of the scripts should be removed from the current model of internet.

If the action is not predicted by the active scripts, then the system tries plan-based reasoning to explain the action in terms of a plan to satisfy one of the current goals of the user. In order to do this, the system uses a knowledge base that incorporates domain knowledge and knowledge of the possible plans and goals of the user. The knowledge base is a relationship-based representation of the plan and goal graph for the given domain. The PGG represents goal-driven problem solving behaviors of the user. The relationships also define how scripts and operator actions are related to the low level plans. Constraints are placed on the relationships to provide a way to account for the context in which the action occurred.

To explain an user action through plan-based reasoning, the system backward chains through its knowledge base to determine if the action was predicted by any of the current plans and goals of the user and his organization. This may require inferring intermediate plans and goals in order to connect the action to a higher level plan or goal that is already active. These new plans and goals will be invoked and incorporated into the current model of the user's intent. The intent interpreter 303 uses non-monotonic reasoning to update the model of the user's current intentions. As mentioned earlier, a side effect of inferring a new plan or goal may require revoking other plans and goals that are found to be inconsistent with the newly added plans and goals. Scripts may be activated or revoked by the inferencing of new plans as well. If the system is unable to explain the user's action either by scripts or plans, it is potentially an operational error by the user.

Intent interpreter 303 is a valuable, but not an essential component of the present invention. However, the intent interpreter 303 provides a mechanism for building an intelligent decision support system to assist corporate managers in viewing, analyzing, modifying, simulating, and testing the business processes and the data stored in a business process management system.

Script performer 305 can be used to execute multiple parallel situated scripts that are stored in knowledge base 306. As discussed above, these scripts are sequences of primitive actions whose execution is context sensitive. This component is a valuable tool in increasing the efficiency of the system to support real-time performance. The scripts can be thought of as a knowledge representation optimized for execution; just as executables can be viewed as optimized representations of source code.

The information manager 304 component of this embodiment of the present invention provides automatic information management features for the user interface. The information manager 304 uses knowledge stored in knowledge base 306 including the present intent of a user as determined by intent interpreter 303 to decide what information should be displayed to the user. Information needed by a user changes as the user's tasks and intentions change. This embodiment of the present invention uses a model to determine the information needed based on the current knowledge base.

One embodiment of the present invention uses an information manager 304 similar to that described in an article by B. W. Webb, N. D. Geddes, and L. O. Neste entitled "Information Management with a Hierarchical Display Generator." This article describes an implementation of a system that selects and tailors the format of displayed information to the tasks being performed by a user.

Finally, knowledge base 306 stores all knowledge used in the system to conduct reasoning including plans, scripts, assertions, relationships, frames, etc. The knowledge base 306 includes knowledge patterns and knowledge instances. Situation assessor 307 maintains the consistency of the knowledge instances in the knowledge base 306 by identifying and resolving any inconsistent or outdated beliefs. In one embodiment of the present invention, the situation assessor uses a concept graph to update values and beliefs. A concept graph is a knowledge representation of the dependencies between observable data values and higher-level computations and assertions made about the data.

In one embodiment of the present invention, the concept graph includes one or more means for calculating the degree of belief that the situation assessor 307 has in the values of each concept. One such means for calculating belief is Bayes Formula. When the situation assessor 307 receives new data, concepts that depend on that data are updated and their belief values are also updated. As a result of the updated belief values, the situation assessor 307 may reduce its belief in a concept, providing for non-monotonic truth maintenance for the situation assessor 307.

In another embodiment of the present invention, a plurality of dynamic business process management systems after the present invention, and each containing an inference engine with a situation assessor 307, can send and receive concept instances to each other. In this manner, sharing of situations between the separate dynamic business process management systems is performed, allowing all participating systems to take advantage of results and conclusions made by another such system. The communications may take place over a plurality of communications means, including direct connection, telephony, wireless medium, or network, such as Internet or local area networks.

In one embodiment of the present invention, the plans and situations shared by a set of distributed dynamic business process management systems that contain inference engines after the present invention are used by the inference engines to detect conflicts in planning between the collaborating companies. When a new or updated plan is received from a collaborating party by a second collaborating party, the supply chain management inference engine of the second party evaluates the plan provided by the first party for conflicts with any existing plans of the second party. The knowledge base 306 contains specific knowledge defining how plans and goals can be in conflict. In one embodiment, the plan and goal conflict detection uses the approach described in Geddes, N. D. A model for intent interpretation for multiple agents with conflicts (1994). When conflicts are detected with shared plans, the conflicting parties are both notified about the detailed nature of the conflict using the information manager 304.

The following is a simplified illustrative embodiment showing the interactions between the various components of the inference engine. Consider an intelligent decision support system to assist a team of humans in dynamic business process management across several operating departments in a company.

The starting point for the planning cycle is the posting of a high-level goal instance from a plan-goal graph (PGG). The posting of a goal triggers a planning cycle that involves decomposing and specializing high-level goals into low-level actions that can be executed to achieve that goal. Each goal in the PGG has one or more child plans, some of which can be executed directly and some that must be recursively decomposed into subgoals and sub-plans and specialized until the primitive steps are reached. Because the planner is a least commitment planner, commitment to a specialization created during decomposition is limited to only those aspects of the plan for which commitment cannot be deferred. If the system has been configured to interact closely with a human, candidate plans that are successfully decomposed and specialized may be proposed to the operator.

Figure 4:
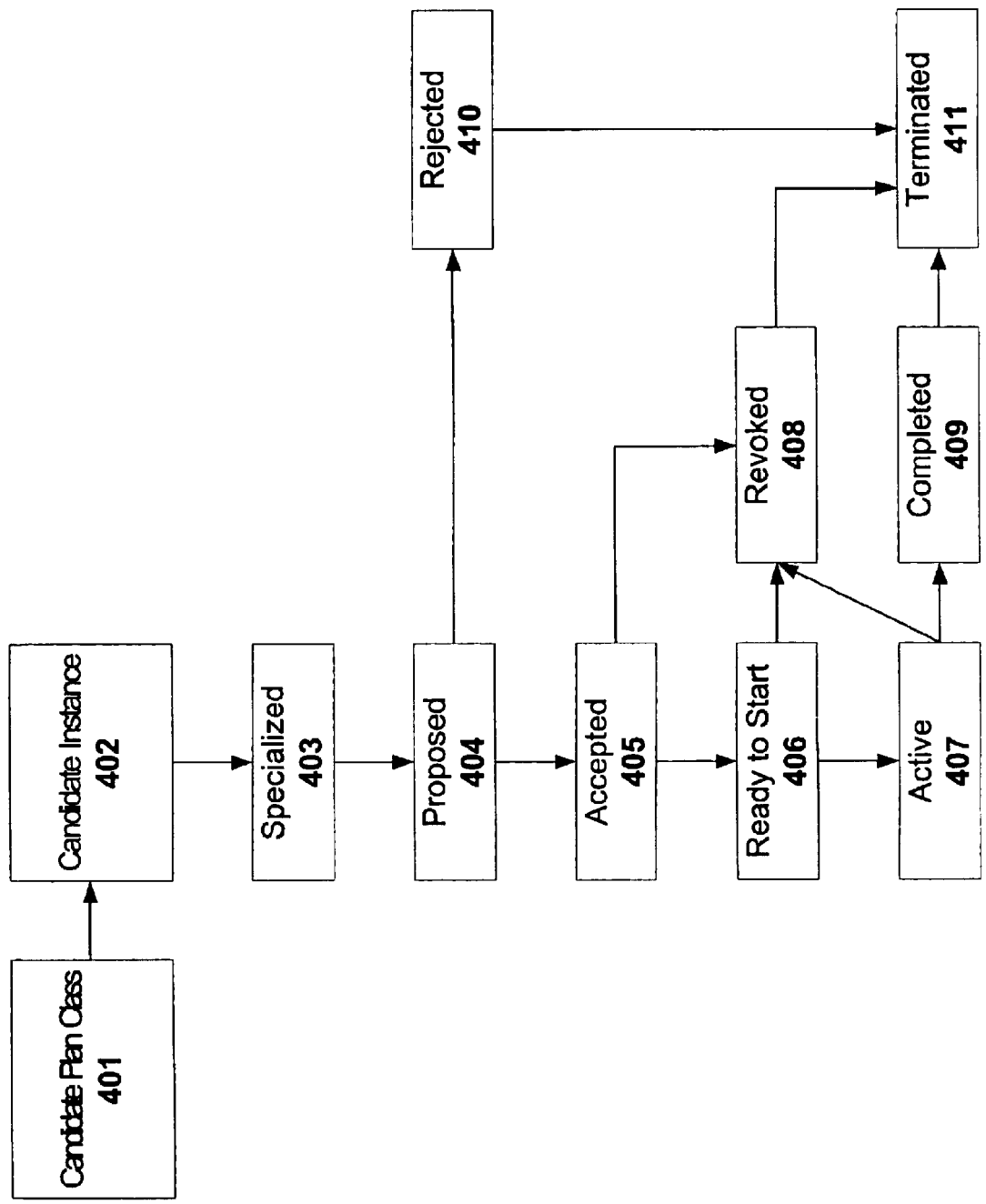
FIG. 4 is a block diagramming describing the life cycle of a plan maintained by a planner according to one embodiment of the present invention.

In addition to creating the decomposition of a plan into its sub-elements, the planner manages the specific life cycle states of each sub-element of a plan. The life cycle states, depicted in FIG. 4, provide the mechanism for managing the commitment of the system to the each of the plan sub-elements. Each of the life cycle states of a: plan sub-element has specific monitoring knowledge associated with it, serving to focus the processing of the situation assessor and providing for an event-based control of the planner.

Throughout the life cycle of a PGG plan or goal, the partial order planner maintains the parameters of the plan or goal and monitors for its success or failure. As a result, the planner can dynamically adjust plan parameters that mediate its execution and dynamically reselect and specialize children of a node as required.

The operation of the system begins in the situation assessor 307. In the simplest embodiments, this component monitors and reads inputs to the system. The situation assessor 307 uses the inputs it receives to add data to the knowledge base regarding the current state of the system. For example, in the present embodiment, the system monitors a user's key presses and mouse clicks to add facts or observations to the knowledge base 306. It may also collect data from remote data systems and financial systems to update the situation of importance to business management.

Figure 5:
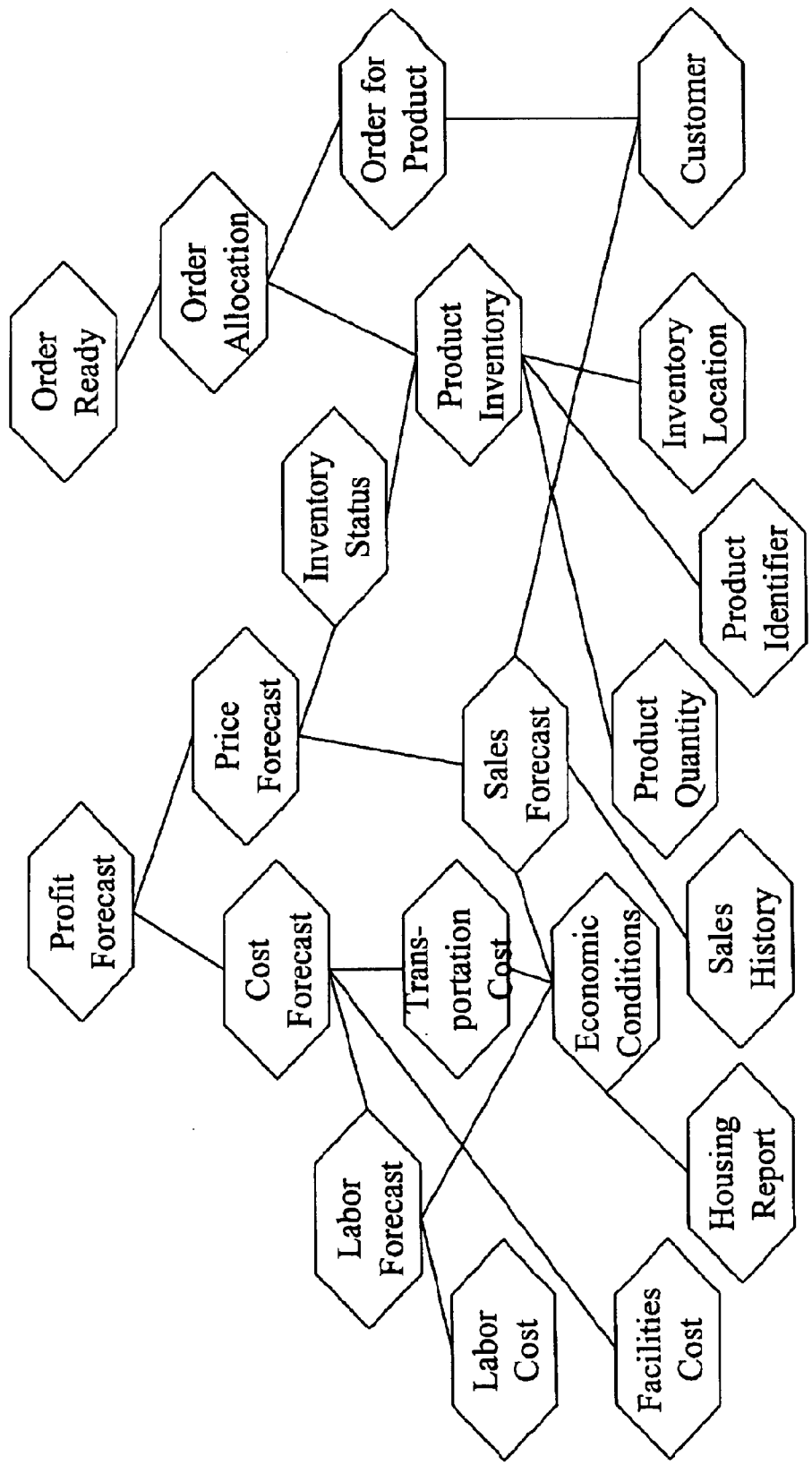
FIG. 5 illustrates a portion of a concept graph according to one embodiment of the present invention.

FIG. 5 shows a portion of a concept graph according to one embodiment of the present invention. The situation assessor 307 stores knowledge about the situations of possible interest in the knowledge base 306 in the form of a concept graph such as the one shown in FIG. 5. The concept graph specifies the relationships between lower level data and higher level concepts. The situation assessor 307 creates concept instances which represent specific data and conclusions that it determines based on its data inputs. The concepts may represent highly aggregated and abstract conclusions about the situation of the business. Each concept is capable of having monitors defined for it that can be activated by the planner 302 as the life cycle states of plans and goals change over time. For example, in FIG. 5, the concept graph shows the relationship between the concept of Profit Forecast and the concepts of Cost Forecast and Price Forecast.

A monitor is a data input that can be defined by the system. Instead of monitoring all possible inputs at one time, embodiments of the present invention provide a mechanism for identifying what data is actually needed. A monitor corresponding to the needed data is then activated so that the needed data can be collected and used in the decision support process.

In this embodiment, the situation assessor 307 can also send and receive copies of concept patterns and instances by communicating with other business management systems also containing a situation assessor 307 and a knowledge base 306. The communication may be achieved by a plurality of methods including local networks, direct connection and wide area networks such as the Internet.

Whenever a new fact is added to the knowledge base 306, the situation assessor 307 processes any monitors related to the new fact. If a monitor is found to be satisfied, an event is generated to the planner 302 that causes the planner to update its planning.

Whenever a new fact is added to the knowledge base 306 that represents the execution of a primitive action by the user, the intent interpreter 303 processes the new assertion to update a model of the current intent of the user. The intent interpreter uses a PGG model of user intentions such as the portion of the one shown in FIG. 6.

FIG. 6 shows a PGG model of user intentions. For example, the top-level plan is Company A Operations. This plan can be decomposed into three subgoals: (1) Have Technology, (2) Have Facilities, and (3) Have Revenue. These goals can, in turn, be decomposed into further plans and so on. A plan may also have a script for completing a plan associated with it or a goal may be fully decomposed into one or more primitive actions.

The intent interpreter 303 searches through the system's PGG models of user intention to determine the possible and likely intentions of the current user. The intent interpreter 303 then instantiates one or more goals based on the current perceived intentions of the user.

Figure 7:
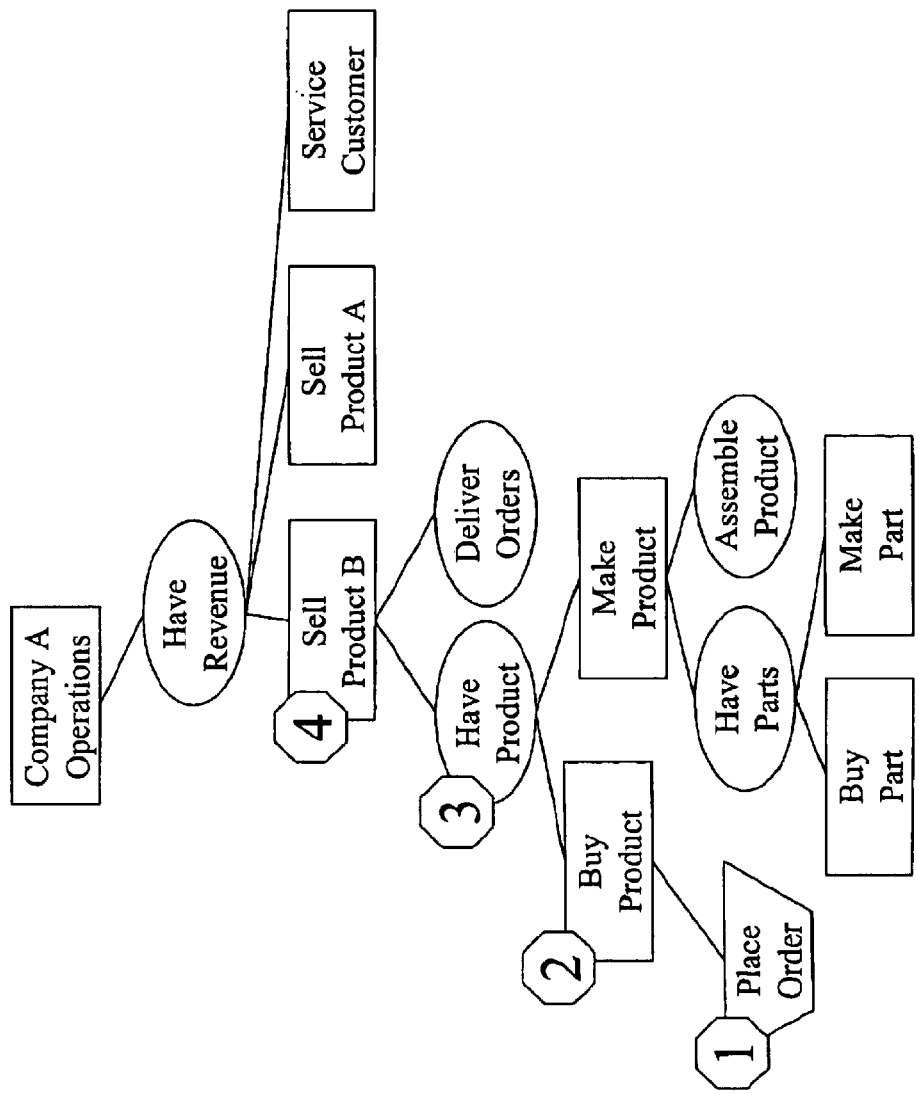
FIG. 7 describes a goal instance created by an intent interpreter according to one embodiment of the present invention.

In FIG. 7, a user at Company A performs a primitive step or action at the user interface by placing a order request (1) with a specific company to purchase a quantity of finished product. The intent interpreter 303 searches for an explanation of this action, and finds in the knowledge base that this action is consistent with buying a product from the supplier. The intent interpreter 303 tentatively hypothesizes that the user plans to buy the product as the plan (2) for satisfying the goal to have the product (3). The intent interpreter 303 then searches for a higher level plan within the knowledge base 306 that explains the goal, and finds that there is an active plan for selling the finished product (4) to create revenue for Company A. Hence, the intent interpreter 303 instantiates the plan (2) and the goal (3) within the knowledge base 306. The posting of the new goal (3) starts the planner 302 to consider if there are more effective alternative plans for the goal, such as making the product at Company A.

The intent interpreter 303 uses non-monotonic reasoning in its search through the PGG knowledge in the knowledge base 306. If it is unable to find a complete path in the PGG from a hypothesized node to one known to be active, it can back up, retract its earlier assumptions and explore other paths.

In this embodiment, the intent interpreter 303 also sends and receives copies of plan and goal patterns and instances by communicating with other business management systems that contain an intent interpreter 303 and a knowledge base 306. The communication may be achieved by a plurality of methods, including local network, direct connection, and wide area networking such as the Internet.

Whenever a goal changes, or whenever a monitor event is received from the situation assessor 307, the planner 302 determines if any further planning needs to take place. For example, if the intent interpreter 303 instantiates a new goal, then the planner 302 needs to create a plan for achieving that goal. In the preferred embodiment, the planner 302 is a least commitment planner that performs a search of the PGGs stored in knowledge base 306 to determine subgoals and actions that need to be taken.

When goal instances and plan instances change life cycle state, the planner 302 uses knowledge in the knowledge base 306 to determine if any of the newly changed or updated goal or plan instances are in conflict with any other goal or plan instances. If a conflict is detected, the planner 302 sends a notification to the user interface.

Figure 8:
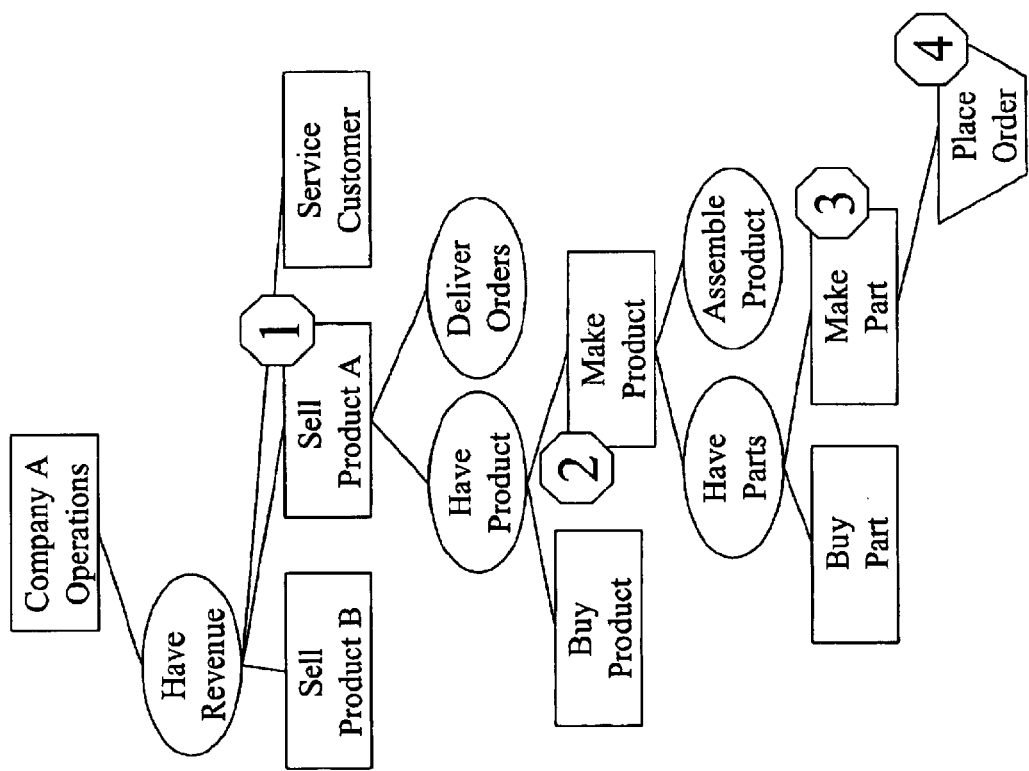
FIG. 8 depicts a portion of a plan-goal graph (PGG) illustrating the operation of a planner according to one embodiment of the present invention.

In FIG. 8, a user at Company A enters data defining the plan to sell product A (1) as a revenue source for Company A. The planner 302 uses knowledge in the knowledge base 306 to determine that product A must be obtained, and considers the make product plan (2). This plan has two subgoals, the first of which is to have the parts available to make the product, and the second subgoal is to assemble the product. The planner 302 uses knowledge in the knowledge base 306 to determine that the product assembly should not be planned until after the parts vendors are selected, so reasoning about the assembly process is deferred until later. Once vendors are chosen, a monitor is satisfied and the planner 302 can resume the solution of the assembly goal. The planner 302 determines that making one of the parts (3) will be more effective than purchasing it and proposes this solution, leading to action (4).

One optimization that is made in the present embodiment is the use of script performer 305. In a particular domain, many plans are commonly encountered and constitute a body of accepted methods known to practitioners within the domain. These plans can be implemented as scripts that represent partially specified procedures that can be executed without the need for extensive planning. The script performer 305 is a component of the present embodiment that facilitates the execution of scripts. These scripts are represented in the system's PGGs that are a part of the knowledge base 306. The script performer 305 can perform many and possibly all of the primitive actions that could be performed by a human user, but the script performer 305 is limited by a set of permissions provided by the human operator.

As an example, consider the goal of having a part, and its child plan of buying the part. Because the process of buying a part from a vendor is a well-defined and frequently recurring sequence of primitive actions, it can be represented as a script. The representation of the goal, its child plan, the script, and the relationship between the plan and the script are all a part of the knowledge base 306.

When a specific instance of the goal of having a part, such as a stamped metal bracket, is encountered, the planner 302 can create the instance of the plan buy the part from a supplier. If the script performer 305 has been given permission, it can execute the script and automatically send the order to the necessary involved parties, including the shipping agent.

The components described above provide a mechanism for assessing the current situation or state of system, planning one or more responses and executing the course of action. The information manager 304 is used to display information to a user or to update the user's display based on the current intentions or plans that have been identified by the planner 302 and the intent interpreter 303 using the knowledge base 306, the script performer 305, and the situation assessor 307.

For example, the knowledge base 306 contains a representation of the information that a human user would need to access if he was involved in a plan to buy a part. One type of information relevant to a plan of this kind might be the commodity prices of the materials used in the part. When an instance of such a plan is created, such as buying an aluminum bracket from Company B, the information manager 304 uses the attributes of the plan and the knowledge base 306 to determine that the price of specific aluminum alloys is of interest to the human. The information manager 304 then commands the display presentations to show pricing data for the correct time period.

Illustrative embodiments of the present invention have now been described. It will be appreciated that these examples are merely illustrative of the present invention. Many variations and modifications will be apparent to those of ordinary skill in the art.

The invention claimed is:

1. A dynamic business process management system comprising:
   a knowledge base including expert knowledge about one or more business process domains;
   wherein the knowledge base includes one or more scripts, each of the one or more scripts comprising a sequence of fully or partially-specified actions;
   an inference engine coupled to the knowledge base, the inference engine including a partial order planner;
   a management system that collects and distributes data regarding one or more business processes and determines one or more goals; and
   a graphical user interface system that displays information regarding the one or more business processes;
   wherein the inference engine uses the partial order planner to determine a plan for achieving at least one of the one or more goals.

2. A dynamic business process management system comprising:
   a knowledge base including expert knowledge about one or more business process domains;
   an inference engine coupled to the knowledge base, the inference engine including a partial order planner;
   wherein the inference engine includes an intent interpreter;
   a management system that collects and distributes data regarding one or more business processes and determines one or more goals; and
   a graphical user interface system that displays information regarding the one or more business processes;
   wherein the inference engine uses the partial order planner to determine a plan for achieving at least one of the one or more goals.

3. A dynamic business process management system comprising:
   a knowledge base including expert knowledge about one or more business process domains;
   an inference engine coupled to the knowledge base, the inference engine including a partial order planner;
   wherein the inference engine includes a non-monotonic truth maintenance system;
   management system that collects and distributes data regarding one or more business processes and determines one or more goals; and
   a graphical user interface system that displays information regarding the one or more business processes;
   wherein the inference engine uses the partial order planner to determine a plan for achieving at least one of the one or more goals.

4. A dynamic business process management system comprising:
   a knowledge base including expert knowledge about one or more business process domains;
   an inference engine coupled to the knowledge base, the inference engine including a partial order planner;
   a management system that collects and distributes data regarding one or more business processes and determines one or more goals; and
   a graphical user interface system that displays information regarding the one or more business processes; and
   wherein:
      the inference engine uses the partial order planner to determine a plan for achieving at least one of the one or more goals; and
      a plurality of distributed dynamic business process management systems, each containing an inference engine communicate data defining the situations and plans of each organization.

5. The system of claim 4, wherein the inference engine detects conflicts between the plans of the participating organizations and notifies the conflicting parties of the nature of the conflict.

6. A dynamic business process management system comprising:
   a knowledge base including expert knowledge about one or more business process domains;
   an inference engine coupled to the knowledge base, the inference engine including a partial order planner;
   a management system that collects and distributes data regarding one or more business processes and determines one or more goals;
   a graphical user interface system that displays information regarding the one or more business processes; and
   a data security mechanism that protects data stored in the knowledge base;
   wherein the inference engine uses the partial order planner to determine a plan for achieving at least one of the one or more goals.

7. The system of claim 6, wherein the data security mechanism maintains an access control list for one or more tables in the knowledge base.

8. The system of claim 7, wherein the data security mechanism maintains an access control list for one or more data records in the knowledge base.

9. A dynamic business process management system comprising:
   a knowledge base including expert knowledge about one or more business process domains;

an inference engine coupled to the knowledge base, the inference engine including a partial order planner;

wherein the partial order planner is a least commitment planner;

a management system that collects and distributes data regarding one or more business processes and determines one or more goals; and a graphical user interface system that displays information regarding the one or more business processes;

wherein the inference engine uses the partial order planner to determine a plan for achieving at least one of the one or more goals.

10. A method for conducting business process management, the method comprising:

determining a goal for a user of the business process management system; and using a knowledge base to create a plan for meeting the determined goal;

wherein the act of determining a goal is performed using a non-monotonic truth maintenance system.

* * * * *

(12) EX PARTE REEXAMINATION CERTIFICATE (7077th)
United States Patent
Geddes et al.

(10) Number: US 6,892,192 C1
(45) Certificate Issued: Sep. 22, 2009

(54) METHOD AND SYSTEM FOR DYNAMIC BUSINESS PROCESS MANAGEMENT USING A PARTIAL ORDER PLANNER

(75) Inventors: Norman D. Geddes, Cumming, GA (US); Douglas M. Hosmer, Marietta, GA (US)

(73) Assignee: Applied Systems Intelligence, Inc., Roswell, GA (US)

Reexamination Request:
No. 90/008,703, Jun. 13, 2007

Reexamination Certificate for:
Patent No.: 6,892,192
Issued: May 10, 2005
Appl. No.: 09/598,750
Filed: Jun. 22, 2000

(51) Int. Cl.
*G06Q 10/00* (2006.01)

(52) U.S. Cl. ............... 706/14; 706/12; 706/61; 706/45

(58) Field of Classification Search .............. None
See application file for complete search history.

(56) References Cited

U.S. PATENT DOCUMENTS

| | | | |
|---|---|---|---|
| 4,658,370 A | 4/1987 | Erman et al. ............... 706/60 |
| 4,881,230 A | 11/1989 | Clark et al. ............... 714/712 |
| 5,119,318 A * | 6/1992 | Paradies et al. ............ 706/52 |
| 5,167,010 A | 11/1992 | Elm et al. ............... 395/50 |
| 5,299,287 A | 3/1994 | Tsuruta et al. ............ 395/51 |
| 5,359,649 A | 10/1994 | Rosu et al. ............... 379/220 |
| 5,406,477 A | 4/1995 | Harhen .................. 364/401 |
| 5,428,619 A | 6/1995 | Schwartz et al. .......... 371/20.1 |
| 5,434,952 A | 7/1995 | Yen et al. ................ 395/50 |
| 5,442,731 A | 8/1995 | Tanaka et al. ............ 395/54 |
| 5,504,837 A | 4/1996 | Griffeth et al. ........... 395/11 |
| 5,550,746 A | 8/1996 | Jacobs ................. 364/479.01 |
| 5,583,763 A | 12/1996 | Atcheson et al. ........ 364/551.01 |
| 5,586,254 A | 12/1996 | Kondo et al. ............ 395/200.1 |
| 5,644,727 A | 7/1997 | Atkins .................... 395/240 |
| 5,655,081 A | 8/1997 | Bonnell et al. .......... 395/200.32 |
| 5,701,400 A | 12/1997 | Amado .................... 706/45 |
| 5,706,406 A | 1/1998 | Pollock .................... 395/55 |
| 5,712,960 A | 1/1998 | Chiopris et al. .......... 395/77 |
| 5,724,263 A | 3/1998 | Raguram et al. .......... 364/552 |
| 5,732,398 A | 3/1998 | Tagawa ..................... 705/5 |
| 5,745,895 A | 4/1998 | Bingham et al. ........... 707/10 |
| 5,754,850 A | 5/1998 | Janssen ................... 395/615 |
| 5,768,578 A | 6/1998 | Kirk et al. ............... 707/100 |
| 5,778,150 A | 7/1998 | Chan et al. ............... 706/46 |
| 5,799,317 A | 8/1998 | He et al. ................ 707/104.1 |
| 5,809,212 A | 9/1998 | Shasha .................... 706/46 |
| 5,835,922 A | 11/1998 | Shima et al. .............. 707/522 |
| 5,845,258 A | 12/1998 | Kennedy .................. 705/8 |
| 5,893,083 A | 4/1999 | Eshghi et al. ............. 706/45 |
| 5,901,246 A | 5/1999 | Hoffberg et al. .......... 382/209 |
| 5,905,715 A | 5/1999 | Azarmi et al. ............. 370/244 |
| 5,918,207 A | 6/1999 | McGovern et al. .......... 705/1 |
| 5,953,707 A | 9/1999 | Huang et al. ............. 705/10 |

(Continued)

FOREIGN PATENT DOCUMENTS

| WO | WO 99/08208 | 2/1999 |
|---|---|---|
| WO | WO 01/16704 | 3/2001 |

OTHER PUBLICATIONS

Intelligent Real–Time Network Management, Apr. 1991, Technical Note 15, Anand S. Rao and Michael P. Georgeff.
Supplementary European Search Report for Application No. EP 01 95 0351, dated Oct. 10, 2007.

(Continued)

*Primary Examiner*—Alexander J Kosowski

(57) ABSTRACT

A dynamic business process management system and method is disclosed for providing using a least commitment planner to better handle the changes and uncertainties that inevitably occur in the real-world. An embodiment of the invention provides a dynamic business process management system using partial-order planning. An additional embodiment of the present invention includes an intent interpreter module that supports the implementation of intelligent decision support functionality in a corporate information management interface.

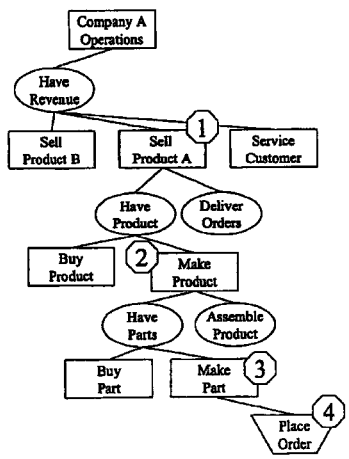

U.S. PATENT DOCUMENTS

| | | | |
|---|---|---|---|
| 5,958,012 A | 9/1999 | Battat et al. | 709/224 |
| 5,963,447 A | 10/1999 | Kohn et al. | 364/148.04 |
| 5,974,395 A | 10/1999 | Bellini et al. | 705/9 |
| 5,983,200 A | 11/1999 | Slotznick | 705/26 |
| 5,995,959 A | 11/1999 | Friedman et al. | 707/3 |
| 6,006,192 A | 12/1999 | Cheng et al. | 705/7 |
| 6,012,044 A | 1/2000 | Maggioncalda et al. | 705/36 |
| 6,012,051 A | 1/2000 | Sammon, Jr. et al. | 706/52 |
| 6,012,152 A | 1/2000 | Douik et al. | 714/26 |
| 6,026,375 A | 2/2000 | Hall et al. | 705/26 |
| 6,049,742 A | 4/2000 | Milne et al. | 700/99 |
| 6,076,099 A | 6/2000 | Chen et al. | 709/202 |
| 6,092,102 A | 7/2000 | Wagner | 340/7.29 |
| 6,115,690 A | 9/2000 | Wong | 705/7 |
| 6,134,580 A | 10/2000 | Tahara et al. | 709/202 |
| 6,151,601 A | 11/2000 | Papierniak et al. | 707/10 |
| 6,154,213 A | 11/2000 | Rennison et al. | 715/854 |
| 6,247,012 B1 | 6/2001 | Kitamura et al. | 707/10 |
| 6,263,358 B1 | 7/2001 | Lee et al. | 718/100 |
| 6,272,482 B1 | 8/2001 | McKee et al. | 706/47 |
| 6,292,811 B1 | 9/2001 | Clancey et al. | 715/503 |
| 6,292,830 B1 | 9/2001 | Taylor et al. | 709/224 |
| 6,292,893 B1 | 9/2001 | Chipman et al. | 713/168 |
| 6,314,555 B1 | 11/2001 | Ndumu et al. | 707/101 |
| 6,360,193 B1 | 3/2002 | Stoyen | 703/17 |
| 6,449,640 B1 | 9/2002 | Haverstock et al. | 709/219 |
| 6,484,155 B1 | 11/2002 | Kiss et al. | 706/46 |
| 6,567,822 B1 | 5/2003 | Cudahy et al. | 707/104.1 |
| 6,725,428 B1 | 4/2004 | Pareschi et al. | 715/530 |
| 6,741,975 B1 | 5/2004 | Nakisa et al. | 706/47 |
| 6,826,552 B1 | 11/2004 | Grosser et al. | 706/47 |
| 6,850,923 B1 | 2/2005 | Nakisa et al. | 706/47 |
| 6,901,384 B2 | 5/2005 | Lynch et al. | 705/38 |
| 2001/0021917 A1 | 9/2001 | Hatano | 705/26 |
| 2002/0087496 A1 | 7/2002 | Stirpe et al. | 706/45 |
| 2002/0095605 A1 | 7/2002 | Royer et al. | 726/7 |

OTHER PUBLICATIONS

Kappa–PC, "Object Browser" [online], [retrieved on Dec. 8, 2003], Retrieved from the Internet: http://www.intellicorp.com/products/kappapc/download/kappa_pc_download.htm.

Preliminary Examination Report for Application No. PCT/US01/19714, dated May 27, 2003 (mailing date).

Preliminary Examination Report for Application No. PCT/US01/19652, dated Feb. 11, 2003.

Preliminary Examination Report for Application No. PCT/US01/19716, dated Jul. 22, 2002 (mailing date).

Written Opinion for Application No. PCT/US01/19714, dated May 18, 2001 (mailing date).

International Search Report for Application No. PCT/US01/19716, dated Oct. 10, 2001 (mailing date).

International Search Report for Application No. PCT/US01/19714, dated Sep. 18, 2001 (mailing date).

International Search Report for Application No. PCT/US01/19713, dated Sep. 6, 2001 (mailing date).

Hess, Traci J., "Using Autonomous Software Agents to Create Next Generation of Decision Support Systems," *Decision Sciences*, vol. 31, No. 1, p. 1, Mar. 31, 2000.

"ERP Goes Mid–Market," *Modern Materials Handling*, v. 55, n. 1, p. 65, Jan. 2000.

Weld, Daniel S., "Recent Advances in AI Planning," *AI Magazine*, vol. 20, No. 2, p. 93, Summer, 1999.

Jedd, Marcia, "The Next Big Thing," *World Trade*, v. 12, n. 2, pp. 60–62, Feb. 1999.

Geddes, N. D., Smith, D. M., and Kizza, C. S., (1998) "Fostering Collaboration in System of Systems," *1998 IEEE International Conference on Systems, Man, and Cybernetics*, La Jolla, California, Oct. 11–14, 1998.

Weld, Daniel S., "Recent Advances in AI Planning," Oct. 8, 1998, University of Washington, 1–49.

Geddes, N. D., and Lee, Robert J (1998), "Intelligent Control for Automated Vehicles: A Decision Aiding Method for Coordination of Multiple Uninhabited Tactical Aircraft," *AUVSI '98 25$^{th}$ Annual Symposium and Exhibition*, Jun. 8–12, 1998, Huntsville, Alabama.

Collis, J. C. and Lee, L. C., "Building Electronic Marketplaces with the ZEUS Agent Tool–Kit," *Agent Mediated Electronic Commerce, First International Workshop on Agent Mediated Electronic Trading*, AMET–98, May 10, 1998, Minneapolis, MN.

McCarthy, John, "Nonmonotonic Reasoning," *Partial Formalizations and the Lemmings Game* [online], Mar. 2, 1998 [retrieved on Dec. 10, 2003], Retrieved from the Internet: http://www.formal.Stanford.edu/jmc/lemmings/node22.html.

Geddes, N. D., (1997) "A Portable Lightweight Associate for Urban Helicopter Pilotage," *16$^{th}$ AIAA Digital Avionics Systems Conference*, Oct. 1997, Irvine, CA.

Geddes, N. D., (1997) "Associate Systems: A Framework for Human–Machine Cooperation," *HCI Conference*, Aug. 24–29, 1997, San Francisco, CA.

Geddes, N. D., (1997) "Human Centered Approaches to Mixed Initiative Planning," *DARPA P&DA Program*, May 6, 1997.

Wegner, Peter, "Why Interaction is More Powerful Than Algorithms," *Communications of the ACM*, v. 40, n. 5, pp. 80–91, May 1997.

Geddes, N. D., (1997) "Large Scale Models of Cooperative and Hostile Intentions," *IEEE Computer Society International Conference and Workshop on Engineering of Computer Based Systems (ECBS '97)*, Mar. 24–28, 1997, Monterey, CA.

Gilbert, D. and Janca, P., "Intelligent Agents: Internet Usability Enhancers," *19$^{th}$ Annual Pacific Telecommunications Conference*, PTC '97, pp. 677–682.

"Smart Move in a Networked World," *Computer Reseller News*, n. 731, p. 117, 1997.

"Microsoft Computer Dictionary," Third Edition, pp. i, 19, 256, and 260, 1997.

Ross, Julie Ritzer, "Test Probes Consumers' On–Line Shopping Need Stores," *Intelligent Agent*, v. 78, n. 11, pp. 47–48, Nov. 1996.

Geddes, N. D. and Brown, J. L., (1996) "A Shared Model of Intentions for Free Flight," *AIAA/IEEE Digital Avionics Systems Conference*, pp. 179–184, Oct. 27–31, 1996, Atlanta, GA.

Houlder, Vanessa, "Technology: Fingers That Shop Around Retailing Faces on Upheaval Caused by 'Intelligent Agents' on the Internet," *Financial Times London Edition*, p. 14, Sep. 24, 1996.

"Andersen Projec6t Examines How Electronic Merchants Can Better Target Customers," *Software Industry Report*, v. 28, n. 17, p. 1(2), Sep. 2, 1996.

"New Intelligent Agent Tackles Internet Privacy Issues: Andersen Consulting Experiment Examines How Electronic Merchants Can Better Target Customers in Cyberspace," *Business Wire*, p. 8271291, Aug. 27, 1996.

Renwei, Li and Pereira, L. M., "Knowledge–Based Situated Agents Among Us, Intelligent Agents III, Agent Theories, Architectures and Languages," *ECIA '96 Workshop,* Aug. 12–13, 1996, Budapest, Hungary.

Tambe, Milind, "Tracking Dynamic Team Activity," University of Southern California, Marina del Rey, CA, *Proceedings of the 1996 13th National Conference on Artificial Intelligence, AAAI 96, Part 1 (of 2),* Held at Portland, Ohio, Aug. 4, 1996 to Aug. 8, 1996.

Laborie, P. and Ghallab, M., "Planning With Sharable Resource Constraints," *IJCAI–95 Proceedings of the 14th International Joint Conference on Artificial Intelligence,* vol. 2, pp. 1643–1649, Aug. 20–25, 1995, Montreal, Quebec, Canada.

Correll, James G., "Re–Engineering the MRP II Environment: The Key is Successfully Implementing Change," *IIE Solutions,* v. 27, n. 7, pp. 24–27, Jul., 1995.

Weld, Daniel S., "An Introduction to Least Commitment Planning," pp. i–ii and 1–51, Summer/Fall, 1994.

Shalin, V. L. and Geddes, N. D., (1994) "Task Dependent Information Management in a Dynamic Environment: Concept and Measurement issues," *IEEE,* 1994.

Geddes, N. D., (1994) "A Model for Intent Interpretation for Multiple Agents with Conflicts," *IEEE International Conference on Systems, Man and Cybernetics,* Oct. 2, 1994, San Antonio, TX.

Soutchanski, M. and Ternovskaia, E., "Logical Formalization of Concurrent Actions for Multi–Agent Systems, Intelligent Agents," *ECAI–94 Workshop on Agent Theories, Architectures and Languages,* Aug. 8–9, 1994, Amsterdam, Netherlands.

Etzioni, Oren and Weld, Daniel, "A Softbot–Based Interface to the Internet," *Communications of the ACM,* v. 37, n. 7, pp. 72–76, Jul. 1994.

Eklund, Peter w., "Research Developments in Multiple Inheritance with Exceptions," *The Knowledge Engineering Review,* v. 9, n. 1, pp. 21–55, Mar. 1994.

Barrett, Anthony, et al., "Partial Order Planning: Evaluating Possible Efficiency Gains," Feb. 19, 1993, University of Washington, 1–50.

Shalin, V. L., Geddes, N. D., Mikesell, B., and Ramamurthy, M., (1993) "Evidence for Plan–Based Performance and Implications for Information Management on the Commercial Aviation Flight Deck, "*4th International Conference on Human–Machine Interaction and AI in Aerospace,* Sep. 1993, Toulouse, France.

Shalin, V. L., Geddes, N. D., et al., (1993) "Expertise in Dynamic Physical Task Domain," To Appear in Feltovich, P., Ford, K., and Hoffman R. (Eds.), *Expertise in Context: Human and Machine.*

Miller, C. A., Shalin, V. L. Geddes, N. D., and Hoshstrasser, B., (1992) "Plan–Based Information Requirements: Automated Knowledge Acquisition to Support Information Management in an Intelligent Pilot–Vehicle Interface," *Proceedings of the 11th Digital Avionics Systems Conference,* Seattle, WA, 1992.

Geddes, N. D., Pullum, L., and Hoffman, M. A., (1992) "Intelligent Interfaces in Command and Control Systems," *Proceedings of IEEE Conference on C3I Technology and Applications,* Jun. 1–4, 1992, Rome, New York.

Shalin, V. L., Miller, C. A., Geddes, N. D., Hoshstrasser, B. D., and Levi, K. R., (1992) "AI Plan as Indicators of Human Information Requirements".

Corkill, Daniel D., "Blackboard Systems," *AI Expert,* vol. 6, No. 9, pp. 40–47, Sep. 1991.

Chandrasekaran, B., Bhatnagar, R., and Sharma, D. D., "Real–Time Disturbance Control," *Communications of the ACM,* v. 34, n. 8, p. 32(16), Aug. 1991.

Edwards, G. R. and Geddes, N. D., (1991) "Deriving a Domain–Independent Architecture for Associate Systems From Essential Elements of Associate Behavior," *Associate Technology: Opportunity and Challenges,* Lehner, P. E. (Editor), Fairfax, VA: George Mason University, Jun. 1991, pp. 17–29.

Lizza, C. S., Banks, S. B., (1991) "Pilot's Associate: A Cooperative, Knowledge–Based System Application," *DARPA Strategic Computing Initiative, IEEE Expert,* Jun. 1991.

Geddes, N. D. and Hammer, J. M., (1991) "Automatic Display Management Using Dynamic Plans and Events," *Proceedings of the 6th Symposium on Aviation Psychology,* May 6–11, 1991, Columbus, OH.

Banks, et al., "A Cooperative, Knowledge–Based System Application," *Pilot's Associate, IEEE Expert,* Wright–Patterson Air Force Base, 0885/9000/91/0600–001, 1991.

Rouse, W. B., Geddes, N. D. and Hammer, J. M., (1990) "Computer–Aided Fighter Pilots," *IEEE Spectrum,* Mar. 1990, pp. 38–41.

Shalin, V. L., Geddes, N. D., Hoshstrasser, B. D., Miller, C. A., Levi, K. R., and Persbacher, D. L., (1990) "Towards a Theory of Pilot Information Requirements During Plan Development and Execution," *Proceedings of CERT 90,* Toulouse, France.

Sewell, D. R. and Geddes, N. D., (1990) "A Plan and Goal Based Method for Computer–Human System Design," *Human Computer Interaction: INTERACT 90,* New York: North Holland, 283–288.

Geddes, N. D. and Hoffman, M. A., (1990) "Supervising Unmanned Roving Vehicles Through an Intelligent Interface, "*Proceedings of the 1990 Space Operations and Robotics Conference,* Albuquerque, NM.

Friedman, Marc, et al., "Least–Commitment Action Selection," University of Washington, 8 pp.

Hoshstrasser, B. D. and Geddes, N. D., (1989) "OPAL: Operator Intent Inferencing for Intelligent Operator Support Systems," *Proceedings of the IJCAI–89 Workshop on Integrated of Human–Machine Intelligence in Aerospace Systems,* Shalin, V. L. and Boy, G. A. (Editors), Aug. 1989, Detroit, MI.

Webb, B. W., Geddes, N. D., and Neste, L. O., (1989) "Information Management with a Hierarchical Display Generator," *Proceedings of the National Computer Graphics Association,* Washington, DC.

Murayama, et al., "An Inference Mechanism Suited for Real–Time Control," Commun. & Inf. Process Labs., Ntt Corp., Kanagawa, Japan, *Proceedings of the Second International Conference on Industrial and Engineering Applications of AI and Expert Systems,* 1989.

Howard, C. W., Hammer, J. M., and Geddes, N. D., (1988) "Information Display Management in a Pilot's Associate," *Proceedings of the 1988 Aerospace Applications of Artificial Intelligence Conference,* 1, 339–349.

Kanai, Naoki, et al., "An Expert System to Assist Production Planning," *IEEE, International Workshop on Artificial Intelligence for Industrial Applications,* pp. 219–224, 1988.

Sewell, D. R., Geddes, N. D., and Rouse, E B., (1987) "Initial Evaluation of an Intelligent Interface for Operators of Complex Systems," In G. Salvendy (Eds), *Cognitive Engineering in the Design of Human–Computer Interaction and Expert Systems* (551–558), New York: Elsevier.

Rouse, W. B., Geddes, N. D., and Curry, R. E., (1987) "an Architecture for Intelligent Interfaces: Outline of an Approach to Supporting Operators of Complex Systems," *Human–Computer Interaction,* 3, 87–122.

Hammer, J. M. and Geddes, N. D., (1987) "Design of an Intelligent Monitor for Human Error in a Complex System," Paper presented at *AIAA Computers in Aerospace VI Conference,* Wakefield, MA.

Geddes, N. D., (1986) "The Use of Individual Differences in Inferring Human Operator Intentions," *Proceedings of the Second Annual Aerospace Applications of Artificial Intelligence Conference,* pp. 30–41.

Geddes, N. D., (1985) "Intent Inferencing Using Scripts and Plans," *Proceedings of the First Annual Aerospace Applications of Artificial Intelligence Conference,* pp. 160–172.

Rich, Elaine, "Artificial Intelligence," pp. 40–45, 72–75, 201, 204–207, 214–223, 247–277, and 284–285, New York: McGraw Hill (ISBN 0–07–052261–8), 1983.

Schank, R. C. and Riesbeck, C. K., "Inside Computer Understanding," Hillsdale, NJ, Lawrence Erlbaum Associates, Copyright 1981, 6 pp.

Charniak, E., Riesbeck, C. K., and McDermott, D., "Artificial Intelligence Programming," Hillsdale, NJ, Lawrence Erlbaum Associates, Copyright 1980, 7 pp.

Schank, R. C. and Abelson, R., "Scripts, Plans, Goals and Understanding, an Inquiry Into Human Knowledge Structures," Hillsdale, NJ, Lawrence Erlbaum Associates, Copyright 1977, 6 pp.

Sacerdoti, E. D., "A Structure for Plans and Behaviors," New York Elsevier, Copyright 1977, 6 pp.

Rinnooy, Kan, A.H.G., "Machine Scheduling Problems," The Hague, Martinus Niijhoff (1976), 5 pp.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *